United States Patent
Jin et al.

(10) Patent No.: US 9,807,376 B2
(45) Date of Patent: Oct. 31, 2017

(54) STEREOPSIS DISPLAY DEVICE

(71) Applicant: LG Display Co., Ltd., Seoul (KR)

(72) Inventors: You-Yong Jin, Seoul (KR); ByungJoo Lee, Seoul (KR); Juhoon Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 75 days.

(21) Appl. No.: 14/971,351

(22) Filed: Dec. 16, 2015

(65) Prior Publication Data

US 2016/0269718 A1    Sep. 15, 2016

(30) Foreign Application Priority Data

Mar. 12, 2015 (KR) .................. 10-2015-0034593
May 29, 2015 (KR) .................. 10-2015-0076614

(51) Int. Cl.
- *H04N 13/04* (2006.01)
- *H04N 9/47* (2006.01)
- *G02B 27/22* (2006.01)

(52) U.S. Cl.
CPC ....... *H04N 13/0404* (2013.01); *G02B 27/225* (2013.01); *G02B 27/2214* (2013.01); *H04N 13/0415* (2013.01); *H04N 13/0422* (2013.01); *H04N 13/0447* (2013.01); *H04N 13/0497* (2013.01)

(58) Field of Classification Search
USPC ......... 348/59, 79, 202, 208.6, 208.8, 208.11, 348/211.9, 224.1, 240.99, 240.1, 240.2, 348/240.3, 274, 291, 293, 301, 308, 309, 348/347, 360, 428.1, 565, 661, 781, 790, 348/800, 823; 345/3.3, 88, 309, 419, 345/426, 603, 604, 613, 641, 653, 654, 345/695, 698; 359/19, 20, 201.1, 210.1, 359/210.2, 354, 440, 489.18, 642, 687, 359/691; 349/15, 16, 54, 139, 143
See application file for complete search history.

(56) References Cited

U.S. PATENT DOCUMENTS

| | | | |
|---|---|---|---|
| 5,235,447 A | * | 8/1993 | Hepp ................ G02F 1/133514 349/109 |
| 5,833,507 A | | 11/1998 | Woodgate et al. |
| 6,064,424 A | | 5/2000 | Van Berkel et al. |

(Continued)

FOREIGN PATENT DOCUMENTS

| | | |
|---|---|---|
| EP | 0752609 A2 | 1/1997 |
| EP | 0791847 A1 | 8/1997 |

(Continued)

*Primary Examiner* — Jefferey F Harold
*Assistant Examiner* — Mustafizur Rahman
(74) *Attorney, Agent, or Firm* — Dentons US LLP

(57) ABSTRACT

Disclosed is a stereopsis display device that includes, for example, a plurality of sub-pixels including openings; a black matrix defining the openings; and a plurality of lenticular lenses slanted at a slant angle, wherein one view matrix includes a unit of M number of sub-pixels arranged in a first direction and N number of sub-pixels arranged in a second direction, wherein M and N are a positive integer, that is divided into sub-pixels opened by the openings and sub-pixels covered by the black matrix, and wherein a number of the sub-pixels of the unit opened by the openings within a viewing zone formed by the lenticular lenses is N.

20 Claims, 23 Drawing Sheets

(56) References Cited

U.S. PATENT DOCUMENTS

| | | | | |
|---|---|---|---|---|
| 8,174,008 B1* | 5/2012 | Chiang | H01L 51/56 | 257/40 |
| 8,698,966 B2* | 4/2014 | Liu | G02B 27/2214 | 349/15 |
| 8,902,300 B2* | 12/2014 | Saito | G03B 35/18 | 348/51 |
| 2005/0259323 A1* | 11/2005 | Fukushima | G02B 27/2214 | 359/462 |
| 2006/0114561 A1 | 6/2006 | Mashitani et al. | | |
| 2007/0188517 A1 | 8/2007 | Takaki | | |
| 2008/0074886 A1* | 3/2008 | Chang | F21V 7/0091 | 362/309 |
| 2008/0316379 A1 | 12/2008 | Zuidema et al. | | |
| 2009/0322702 A1* | 12/2009 | Chien | G06F 3/0412 | 345/174 |
| 2010/0328228 A1* | 12/2010 | Elias | G06F 3/044 | 345/173 |
| 2011/0019142 A1* | 1/2011 | Inoue | G02F 1/134309 | 349/139 |
| 2012/0013602 A1* | 1/2012 | Lee | G02B 27/2214 | 345/419 |
| 2012/0068324 A1* | 3/2012 | Hoshi | A61B 1/0011 | 257/680 |
| 2012/0249401 A1* | 10/2012 | Omoto | G06F 3/0412 | 345/80 |
| 2013/0147932 A1* | 6/2013 | Tokunaga | G02B 27/2214 | 348/59 |
| 2013/0335538 A1 | 12/2013 | Shestak et al. | | |
| 2014/0029094 A1* | 1/2014 | Kroon | G09G 3/3208 | 359/463 |
| 2014/0111411 A1* | 4/2014 | Guo | G09G 3/2003 | 345/88 |
| 2014/0125892 A1* | 5/2014 | Chen | G02B 27/22 | 349/15 |
| 2014/0285642 A1* | 9/2014 | Hwang | H04N 13/0415 | 348/58 |
| 2015/0341623 A1* | 11/2015 | Kim | H04N 13/0409 | 348/59 |

FOREIGN PATENT DOCUMENTS

| | | |
|---|---|---|
| EP | 1569026 A1 | 8/2005 |
| EP | 1729164 A1 | 12/2006 |
| EP | 1964415 A2 | 9/2008 |
| EP | 2682805 A2 | 1/2014 |

* cited by examiner

< BM CD = -2um >

< BM CD = +2um >

Screen disclination caused by luminance difference

FIG. 7
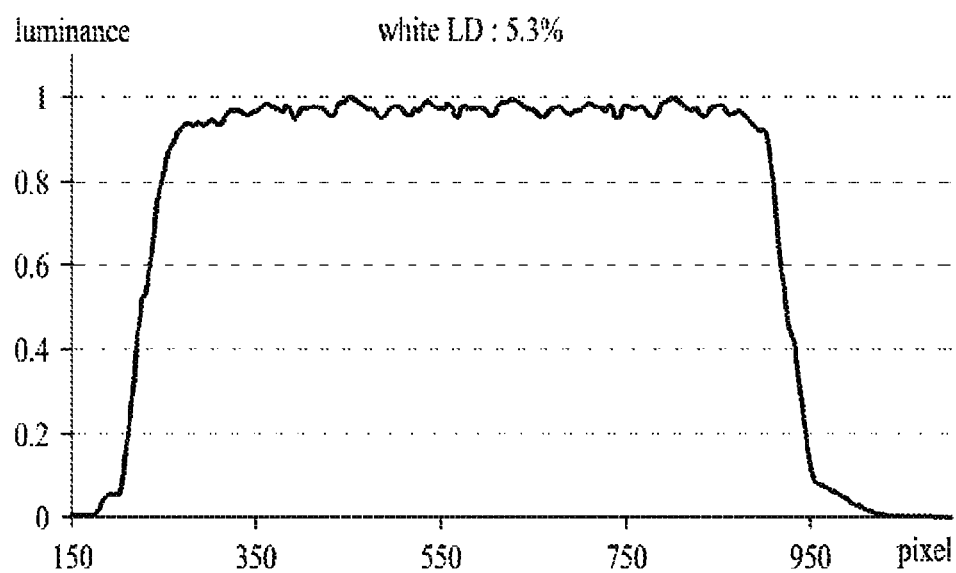
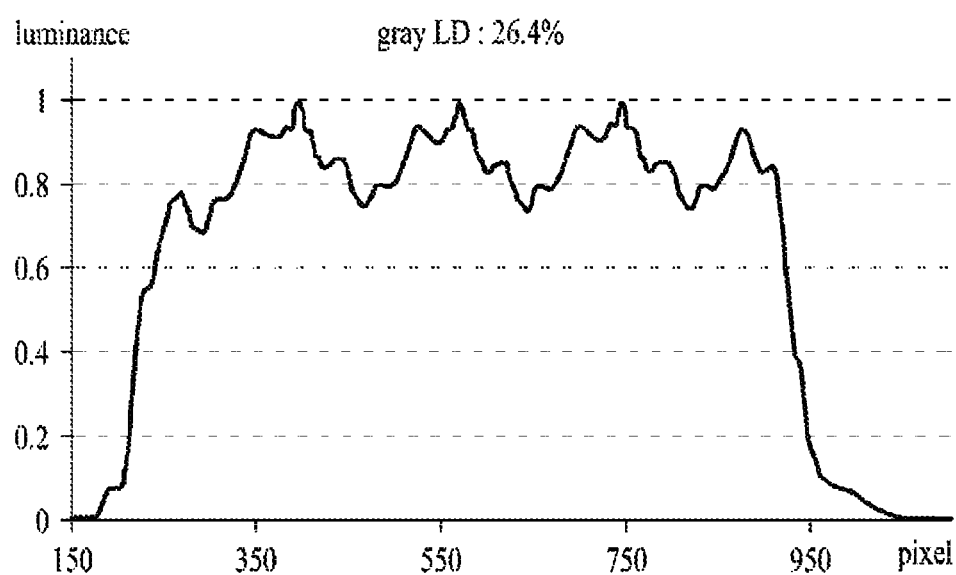

FIG. 14

| resolution (based on 55 inches) | overlap condition of pixels | | gray LD | white LD |
| --- | --- | --- | --- | --- |
| | N | M | | |
| 4K (UHD) | 4 | 9 | 26.4% | 5.3% |
| 4K (UHD) | 9 | 22 | 15.76% | 3.31% |
| 8K | 25 | 62 | 10.9% | 8.7% |
| 8K | 1 | 2 | 81.9% | 72.2% |
| 8K | 1 | 3 | 75.3% | 50.5% |

FIG. 21

STEREOPSIS DISPLAY DEVICE

This application claims the benefit of the Korean Patent Application Nos. 10-2015-0034593 filed on Mar. 12, 2015 and 10-2015-0076614 filed on May 29, 2015, which are hereby incorporated by reference for all purposes as if fully set forth herein.

BACKGROUND OF THE INVENTION

Field of the Invention

The present invention relates to a display device and a manufacturing method thereof. More particularly, the present invention relates to a stereopsis display that allows a user to view 3D images of high quality.

Discussion of the Related Art

Recently, as realistic images are becoming more in demand, stereopsis display devices that display 3D images as well as 2D images are being developed. 2D-image display devices have been greatly advanced in terms of image quality such as resolution and viewing angle, but have a limitation in that 2D-image display devices may not display depth information of an image. On the other hand, 3D-image display devices display stereopsis images instead of 2D-planar images, and thus fully transfer original 3D information to a user. Therefore, in comparison with the existing 2D-image display devices, 3D-image display devices display far more vivid and realistic stereopsis images.

3D-image display devices are largely categorized into 3D-glasses display devices using 3D special glasses and glasses-free 3D-display devices using no 3D special glasses. The glasses-free 3D display devices are the same as 3D-special-glasses display devices in the sense that the glasses-free 3D display devices provide a three-dimensionality of an image to a viewer based on binocular disparity. However, since the glasses-free 3D display devices do not require wearing 3D glasses, the glasses-free 3D-display devices are more advantageous than the 3D-special-glasses display devices. The glasses-free 3D display devices typically may not display multi-view and 3D depth as much as the 3D-special-glasses display device.

FIG. 1 is a diagram illustrating a method of realizing a multi-view in a glasses-free stereopsis display device according to the related art.

Referring to FIG. 1, the stereopsis display device according to the related art displays images through a display panel 10, on which pixels P of red (R), green (G) and blue (B) are arranged, by splitting the images into left-eye images and right-eye images. At this time, a lenticular lens sheet 20 is arranged on the display panel 10 to be slanted along a length direction at a certain angle. Stereopsis images are split into multi-views through the lenticular lens sheet 20 arranged on the display panel 10. An image corresponding to a view map assigned in accordance with the multi-view is displayed on each pixel P in the display panel 10.

The stereopsis display device according to the related art may have a problem in that the display quality of stereopsis images may deteriorate due to a 3D crosstalk as well as a high luminance difference (LD) between viewing zones due to a luminance non-uniformity per viewing zone corresponding to a length direction of a lenticular lens.

In this case, the 3D crosstalk can be represented by a numerical value corresponding to an amount of ghost images, and can refer to a ratio of light information, which corresponds to a view viewed by a viewer with respect to a special view at a certain angle, to light information of the other views. Also, the luminance difference can be represented by a numerical value of luminance non-uniformity level between viewing zones and/or within one viewing zone.

Although the lenticular lens sheet 20 may be slanted at a certain angle to address the luminance difference, the 3D crosstalk (CT) may still exist. A view overlap mode may be used to reduce the 3D crosstalk. However, even with the lens slanting and view overlap mode techniques, the 3D crosstalk may still be higher than an allowable level, thereby making it difficult to display an image with a 3D depth comparable to that of the 3D-glasses display devices.

Also, when the view overlap mode is used, dark parts and light parts of pixels may be accumulated within one viewing zone due to non-uniformity of luminance, thereby generating luminance difference and degrading display quality. Particularly, a black band phenomenon may occur due to an overlap of pixels with low luminance.

SUMMARY OF THE INVENTION

Accordingly, the present invention is directed to a stereopsis display device and method of manufacturing the same that substantially obviates one or more problems due to limitations and disadvantages of the related art.

An advantage of the present invention is to provide a stereopsis display device with improved display quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a stereopsis display device may, for example, include a plurality of sub-pixels including openings; a black matrix defining the openings; and a plurality of lenticular lenses slanted at a slant angle, wherein one view matrix includes a unit of M number of sub-pixels arranged in a first direction and N number of sub-pixels arranged in a second direction, wherein M and N are a positive integer, that is divided into sub-pixels opened by the openings and sub-pixels covered by the black matrix, and wherein a number of the sub-pixels of the unit opened by the openings within a viewing zone formed by the lenticular lenses is N.

In another aspect of the present disclosure, a stereopsis display device may, for example, include a plurality of sub-pixels including openings; a black matrix defining the openings; and a plurality of lenticular lenses slanted at a slant angle, wherein one view matrix includes a unit of 2M number of sub-pixels arranged in a first direction and N number of sub-pixels arranged in a second direction, wherein M is a positive integer and N is a positive integer, and wherein a number of pixel groups opened by the openings within a viewing zone formed by the lenticular lenses is N, and each of the N number of pixel groups includes a plurality of sub-pixels adjacent to each other in the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7 shows a white luminance difference and a gray luminance difference when different types of sub-pixels are overlapped with one another in a view matrix of a 4/9 delta mode;

FIG. 14 shows a white luminance difference and a gray luminance difference when different types of sub-pixels are overlapped with one another in view matrixes of a ½ delta mode, a ⅓ delta mode, a 4/9 delta mode, a 9/22 delta mode and a 25/62 delta mode;

FIG. 21 is a diagram illustrating an arrangement structure of sub-pixels of a stereopsis display device according to an embodiments of the present invention.

DETAILED DESCRIPTION OF THE ILLUSTRATED EMBODIMENTS

Figure 1:
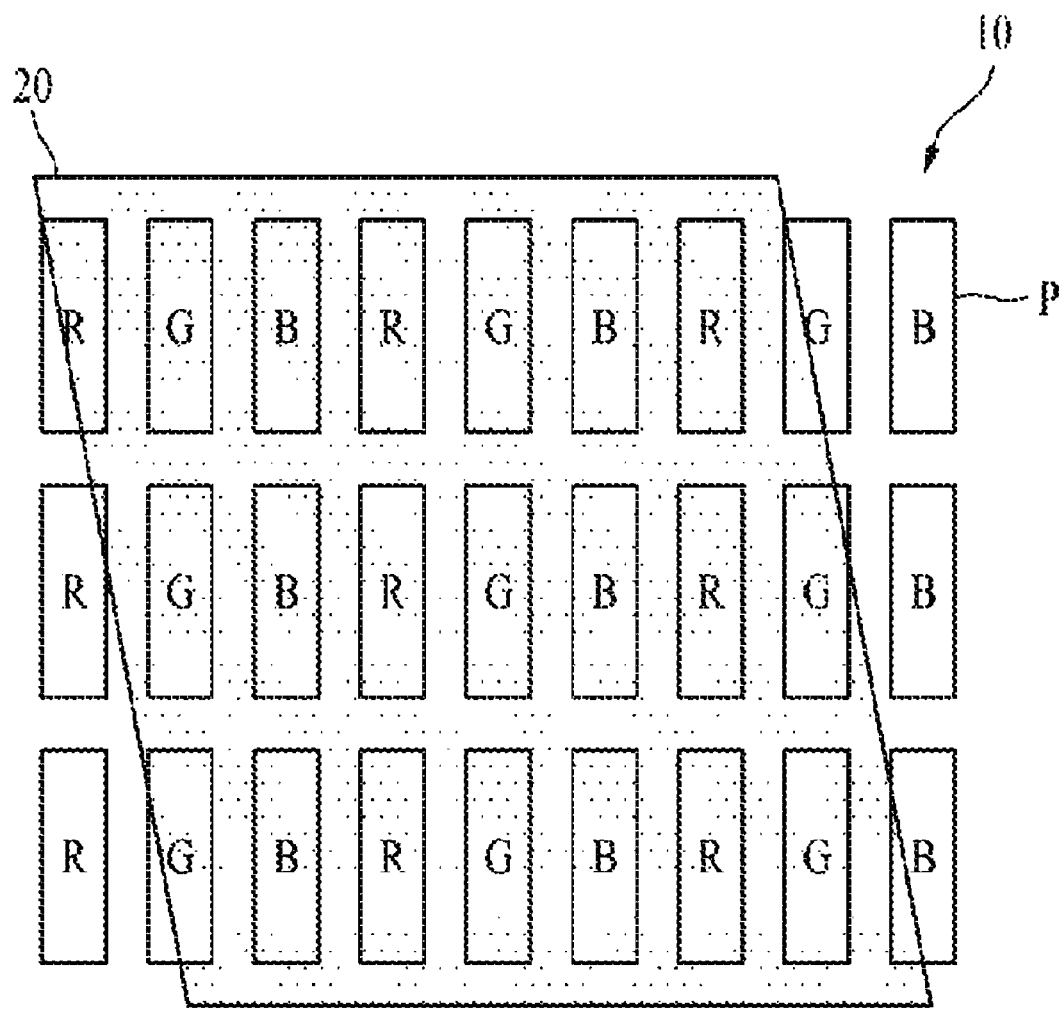
FIG. 1 is a diagram illustrating a method of realizing a multi-view in a glasses-free stereopsis display device according to the related art.

Reference will now be made in detail to embodiments of the present invention, examples of which are illustrated in the accompanying drawings. Wherever possible, the same reference numbers will be used throughout the drawings to refer to the same or like parts. In the following description, a detailed description of known elements or functions that is not relevant to the subject matter of the present invention will be omitted.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In this specification, in adding reference numbers to elements of respective drawings, it is to be noted that the same reference elements have the same reference numbers if possible even though the same reference elements are shown on different drawings.

A shape, a size, a ratio, an angle, and a number disclosed in the drawings for describing embodiments of the present invention are merely an example, and thus, the present invention is not limited to the illustrated details Like reference numerals refer to like elements throughout the specification. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

It will be understood that, although the terms "first", "second", etc. may be used herein to describe various elements, these elements should not be limited by these terms. These terms are only used to distinguish one element from another element. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Various examples of a display panel such as a twisted nematic (TN) mode, a vertical alignment (VA) mode, an in plane switching (IPS) mode and a fringe field switching (FFS) mode have been developed in accordance with a mode for controlling arrangement of liquid crystals.

All of the TN mode, the VA mode, the IPS mode and the FFS mode may be applied to a stereopsis display device according to an embodiment of the present invention without limitation to a mode of a liquid crystal display panel. Also, an embodiment of the present invention can be implemented in an organic light emitting display device, which includes a flat display panel, for example, an organic light emitting display panel, in addition to a liquid crystal panel. However, without limitation to the above examples, other types of display panels can be used as a display panel according to an embodiment of the present invention.

One aspect of an embodiment of the present invention is to provide a stereopsis display device with a reduced luminance difference between viewing zones and/or within a viewing zone. A luminance difference generated in a stereopsis display device may largely be categorized into two types: a luminance difference (external LD) between viewing zones and a luminance difference (internal LD) within one viewing zone.

Hereinafter, a stereopsis display device according to an embodiment of the present invention will be described in detail with reference to the accompanying drawings.

Figure 2A:
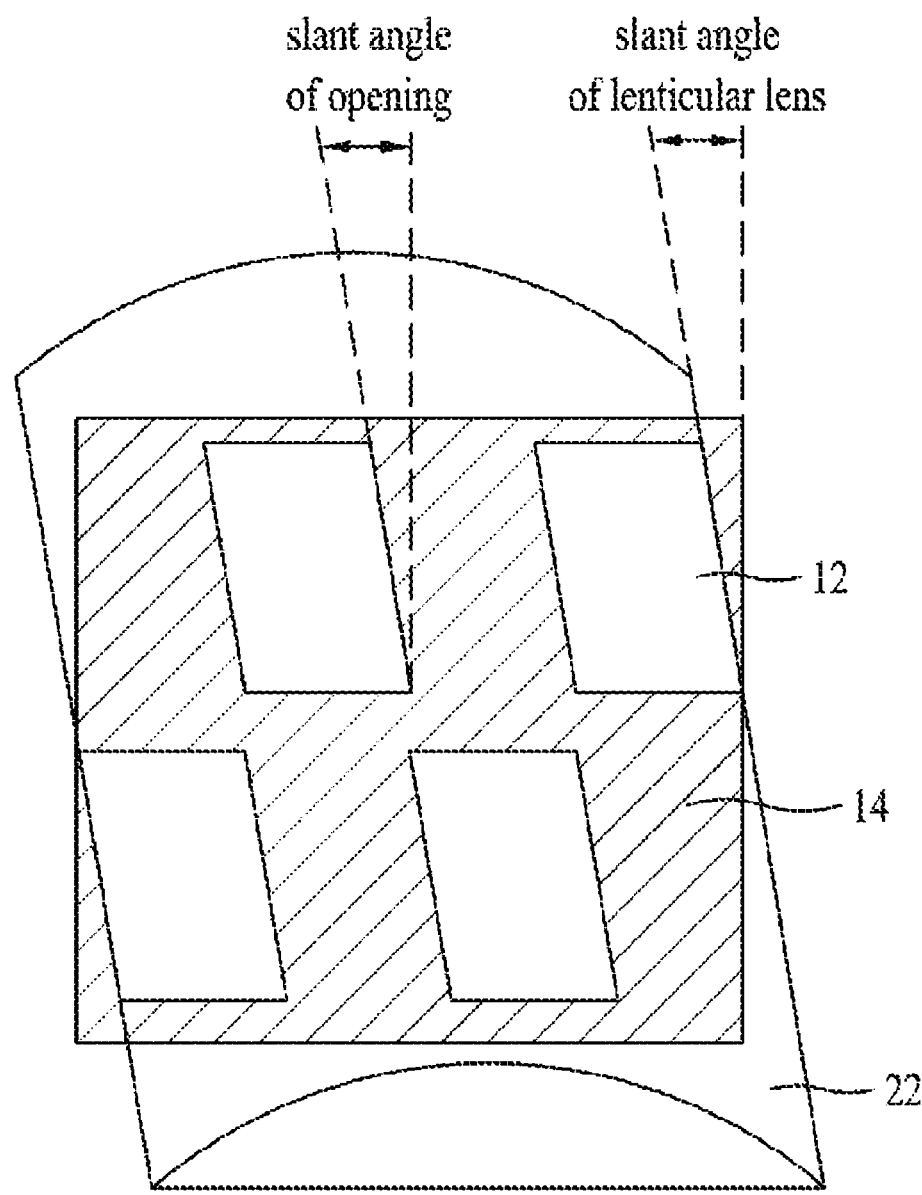
FIG. 2A to 2C are diagrams illustrating that a luminance difference (LD) occurs between viewing zones due to a critical dimension (CD) difference of a black matrix (BM)
Figure 2B:
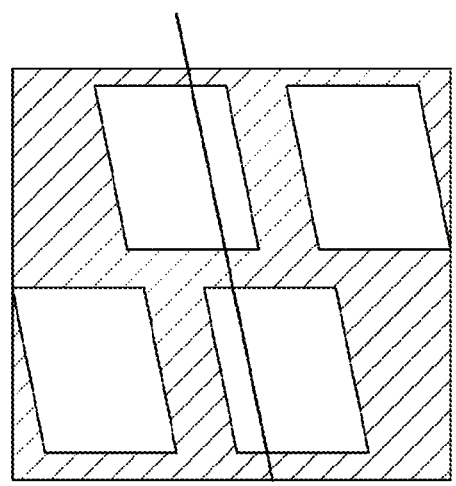
Figure 2C:
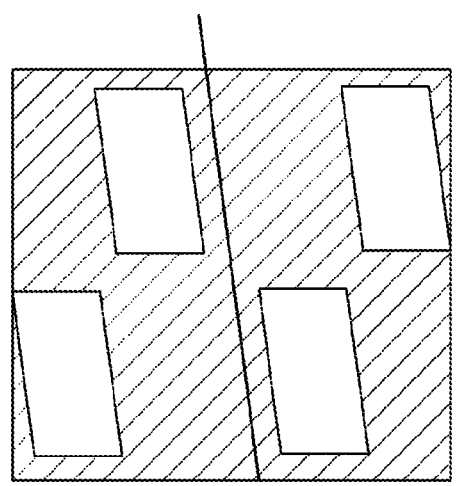
Figure 3A:
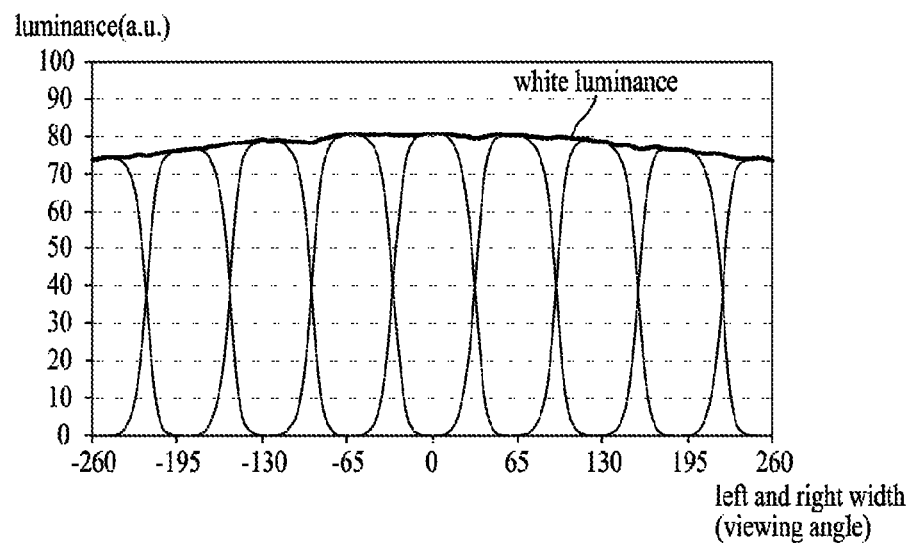
FIG. 3A to 3C are diagrams illustrating a white luminance according to a critical dimension (CD) difference of a black matrix (BM)
Figure 3B:
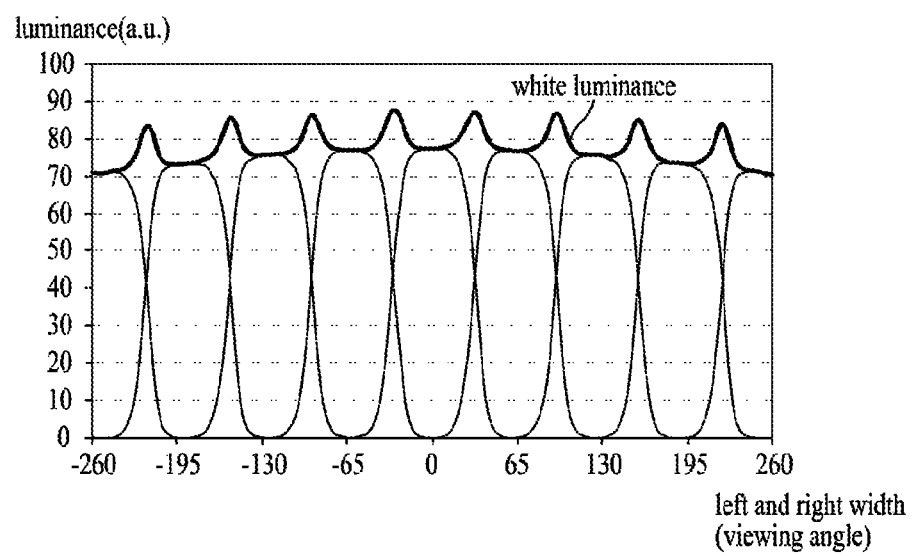
Figure 3C:
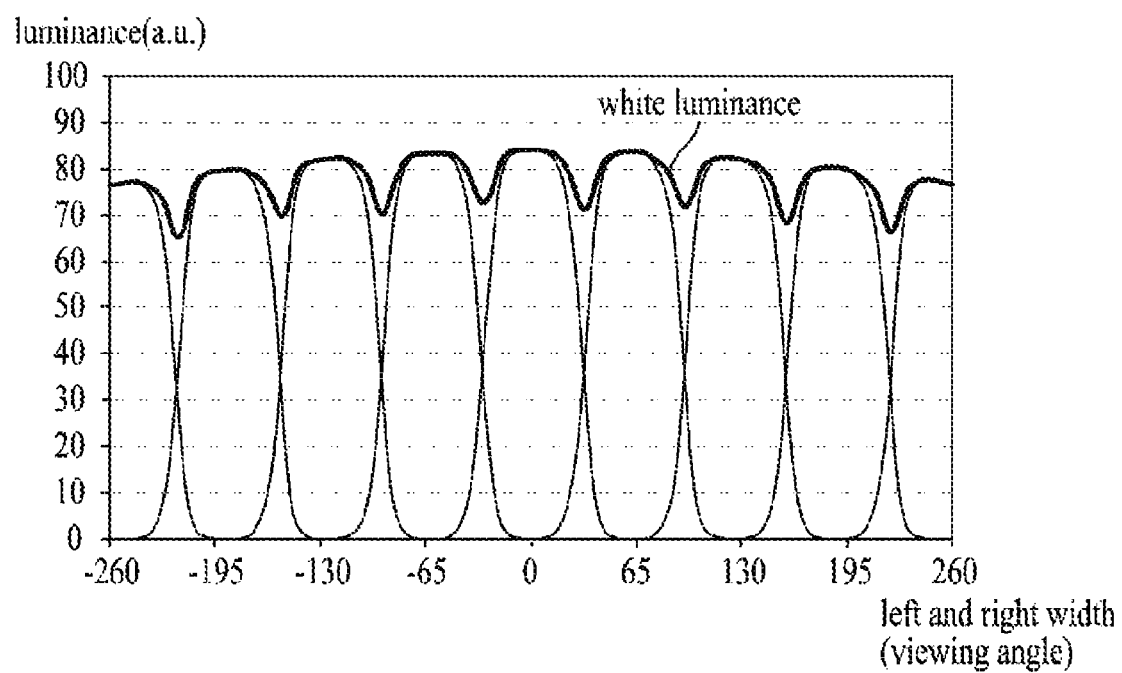

FIG. 2A to 2C are diagrams that illustrate a luminance difference (LD) occurring between viewing zones due to a critical dimension (CD) difference of a black matrix (BM). FIG. 3A to 3C are graphs showing a white luminance according to a critical dimension (CD) difference of a black matrix (BM).

Referring to FIGS. 2A and 3A, in an arrangement structure of pixels where a plurality of viewing zones are overlapped with one another, a black matrix 14 is formed on an upper substrate of the display device such that opening areas 12 of pixels are slanted at a certain angle to address 3D crosstalk and luminance difference. A slant angle of a lenticular lens 22 is formed equally to that of the opening area of each pixel. The opening area 12 and the lenticular lens 22 are formed to have the same slant angle so that viewing zones (views) can be split, and that a depth of 3D images can be expressed.

The opening area 12 of the pixel is formed and the lenticular lens 22 is arranged in a manner to reduce a luminance difference between the viewing zones. However, a luminance difference (LD) may occur between the viewing zones due to a critical dimension (CD) difference generated during a process of arranging the black matrix 14 on the upper substrate of the liquid crystal panel.

As illustrated in FIG. 2A, if the critical dimension of the black matrix 14 is '0', a balance of white luminance is uniformly maintained in view of an entire viewing angle of the display device as shown in FIG. 3A, which means that a luminance difference (LD) between the viewing zones may not occur, or may be lowered at a level that allows a viewer not to perceive a luminance difference.

On the other hand, as illustrated in FIG. 2B, if the critical dimension of the black matrix 14 is reduced to −2 um, the opening area 12 of each pixel is increased. In such a case, a luminance interference between up and down pixels may occur, which may result in a luminance difference (LD) between the viewing zones. In particular, at a portion where the critical dimension of the black matrix 14 is reduced, the luminance is more increased than a design value and thus, a white line (or luminance line) may occur as shown in FIG. 3B.

Subsequently, as illustrated in FIG. 2C, if the critical dimension of the black matrix 14 is increased to +2 um, the opening area 12 of each pixel is reduced. In such a case, a luminance of each pixel is lowered, which may result in a luminance interference between the viewing zones. In particular, at a portion where the critical dimension of the black matrix 14 is increased, the luminance is more reduced than a design value and thus, a black line (or dark line) may be generated as shown in FIG. 3C.

Figure 4:
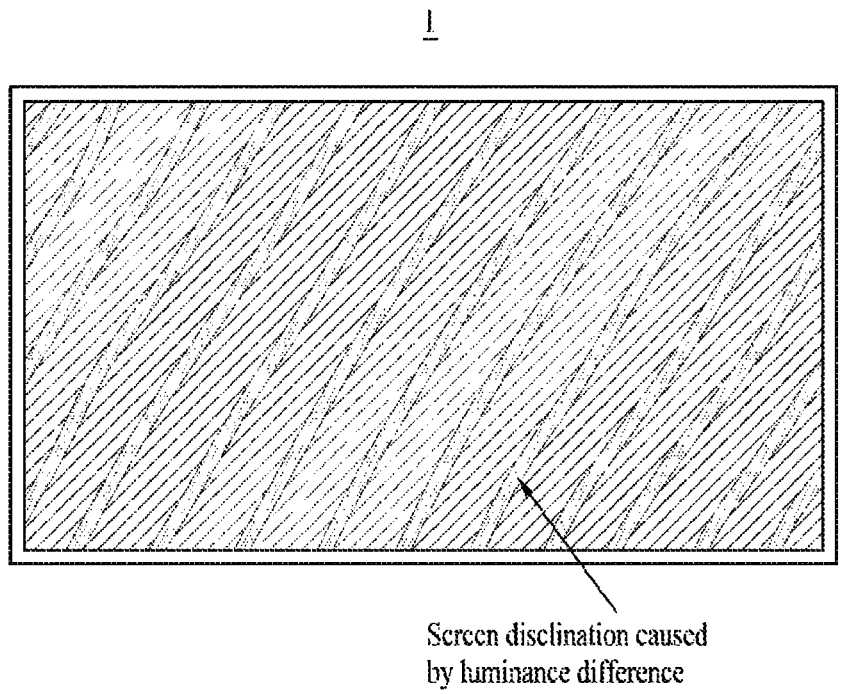
FIG. 4 is a diagram illustrating that display quality deteriorates by a luminance difference between viewing zones.

FIG. 4 is a diagram that illustrates a deterioration of display quality caused by a luminance difference between viewing zones.

Referring to FIG. 4, a luminance difference (LD) may occur between viewing zones by a critical dimension (CD) difference generated during a process of manufacturing a black matrix of a stereopsis display device 1, whereby such a luminance difference may decrease the picture quality of 3D images.

In more detail, if the critical dimension (CD) of the black matrix 14 is reduced, a luminance line is shown on a screen, and if the critical dimension (CD) of the black matrix 14 is increased, a dark line is shown on the screen, whereby a stripe pattern is shown on the screen, as illustrated in FIG. 4. Also, the commercialization of the stereopsis display device may be difficult due to a deterioration of display quality, which is caused by a luminance difference (LD) between the viewing zones.

Figure 5:
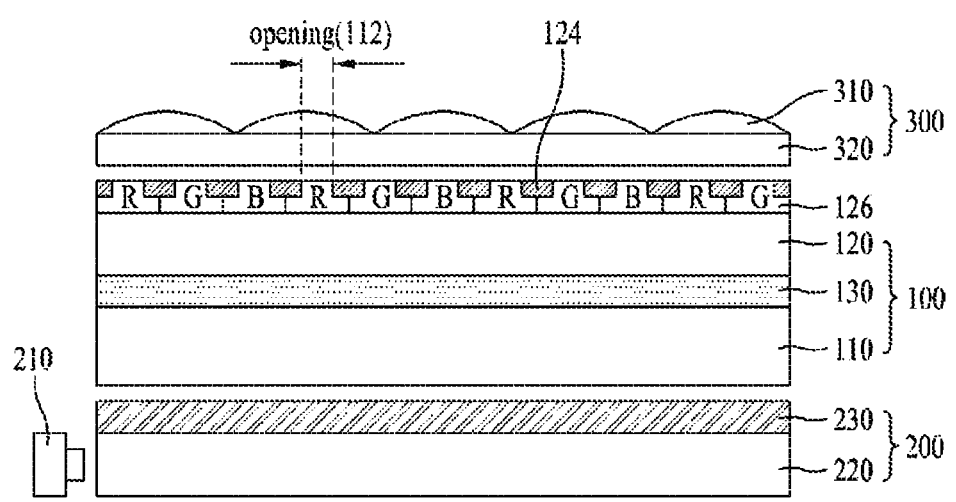
FIG. 5 is a diagram illustrating a stereopsis display device according to an embodiment of the present invention.

FIG. 5 is a diagram illustrating a stereopsis display device according to an embodiment of the present invention.

Referring to FIG. 5, the stereopsis display includes a liquid crystal panel 100, a backlight unit 200, and a lenticular lens sheet 300. The lenticular lens sheet 300 is arranged above the liquid crystal panel 100, and the backlight unit 200 is arranged below the liquid crystal panel 100. In FIG. 5, a driving circuit for driving the liquid crystal panel 100 and a light source 210 of the backlight unit 200 are omitted for brevity. The driving circuit may include a timing controller (T-con), a data driver (D-IC), a gate driver (G-IC), a backlight driver, and a power supply.

Each of the timing controller, the data driver, the gate driver and the backlight driver may be manufactured as a separate integrated circuit (IC) chip, or all of them may be realized as a single IC chip. Meanwhile, the gate driver may be integrated in a non-display area (bezel area) of a first substrate 110 of the liquid crystal panel 100 in an amorphous silicon gate (ASG) mode or gate in panel (GIP) mode. A detail description of the timing controller, the data driver, the gate driver, the backlight unit and a method for driving them will be omitted for brevity.

The liquid crystal panel 100 includes a first substrate 110 (TFT array substrate), a second substrate 120 (color filter array substrate), and a liquid crystal layer 130 interposed between the two substrates 110 and 120.

A plurality of data lines and a plurality of gate lines are formed on the first substrate 110 to define a plurality of pixels, wherein the data lines cross the gate lines. A view map based on a number of multi-views (or views) is assigned to the plurality of pixels.

A thin film transistor (TFT), which is a switching element, a storage capacitor Cst and a pixel electrode are formed in the plurality of pixels. The plurality of pixels are arranged in a matrix, and one unit pixel may be comprised of either red, green and blue pixels or red, green, blue and white pixels.

On a second substrate 120, color filters 126 of red, green and blue and a black matrix 124 defining an opening of each sub-pixel are formed. A common electrode corresponding to the pixel electrode may be arranged on the first substrate 110 or the second substrate 120.

The backlight unit 200 includes a light source 210 for generating light, a light guide plate 220 for guiding the light from the light source 210 toward the liquid crystal panel 100, and a plurality of optical sheets 230 arranged on the light guide plate 220 to improve the efficiency of light. In FIG. 5, a light emitting diode (LED) is used as the light source 210, and an edge type backlight unit 200, of which light source 210 is arranged at a side of the liquid crystal panel 100, is illustrated.

A direction of a liquid crystal layer 130 is controlled by an electric field formed between the pixel electrode and the common electrode of the liquid crystal panel 100, whereby a transmittance of the light emitted from the backlight unit 200 is controlled to display an image.

A touch sensor for detecting a user's touch may be integrated in the liquid crystal panel 100 in an in-cell touch mode. Display driving and touch driving may be divided to display an image and sense the user's touch, respectively. During the display period, a data voltage according to an image data is supplied to the pixel electrode of each pixel, and a common voltage Vcom is supplied to the common electrode, so as to display an image. Meanwhile, during the touch period (non-display period), a touch driving signal is supplied to the common electrode, that is, touch electrode, and then the capacitance of the touch electrode is sensed to detect the presence of a touch and the position of the touch.

The black matrix 124 is formed on an entire region of the second substrate 120 except a plurality of openings 122. Referring to FIG. 5, color filters 126 of red, green and blue are formed in the plurality of openings 122. The light incident upon the opening 122 by transmitting the first substrate 110 and the liquid crystal layer 130 through the color filters 126 of red, green and blue is converted into a desired color for each pixel.

The lenticular lens sheet 300 is arranged above the liquid crystal panel 100. The lenticular lens sheet 300 splits images displayed by each pixel of the liquid crystal panel 100 into a plurality of viewing zones corresponding to a view map. As a result, the viewer is able to view a stereopsis image through the plurality of viewing zones.

The viewer feels a three-dimensionality in a given viewing zone through a binocular disparity between an image perceived by the left eye and an image perceived by the right eye. That is, if multi-views are supported, a viewing position (viewing zone) where each of a plurality of viewers can view 3D images is given to each of the viewers.

In this case, each viewer may view a 3D image in a glassless mode when viewing a screen at a right viewing position. To this end, the lenticular sheet 300 may include a plurality of lenticular lenses 310 formed in a lens shape from an upper surface of a base film 320.

The plurality of lenticular lenses 310 may be formed to be convex from the upper surface of the base film 320 and extended longitudinally in a given direction to have a pillar shape. For example, the plurality of lenticular lenses 310 may have a cross-section of a convex lens having a semi-circle shape or a given curvature. A pitch width of the plurality of lenticular lenses 310 is set to correspond to a number of multi-views (or viewing zones) and a size of the pixel.

Figure 6:
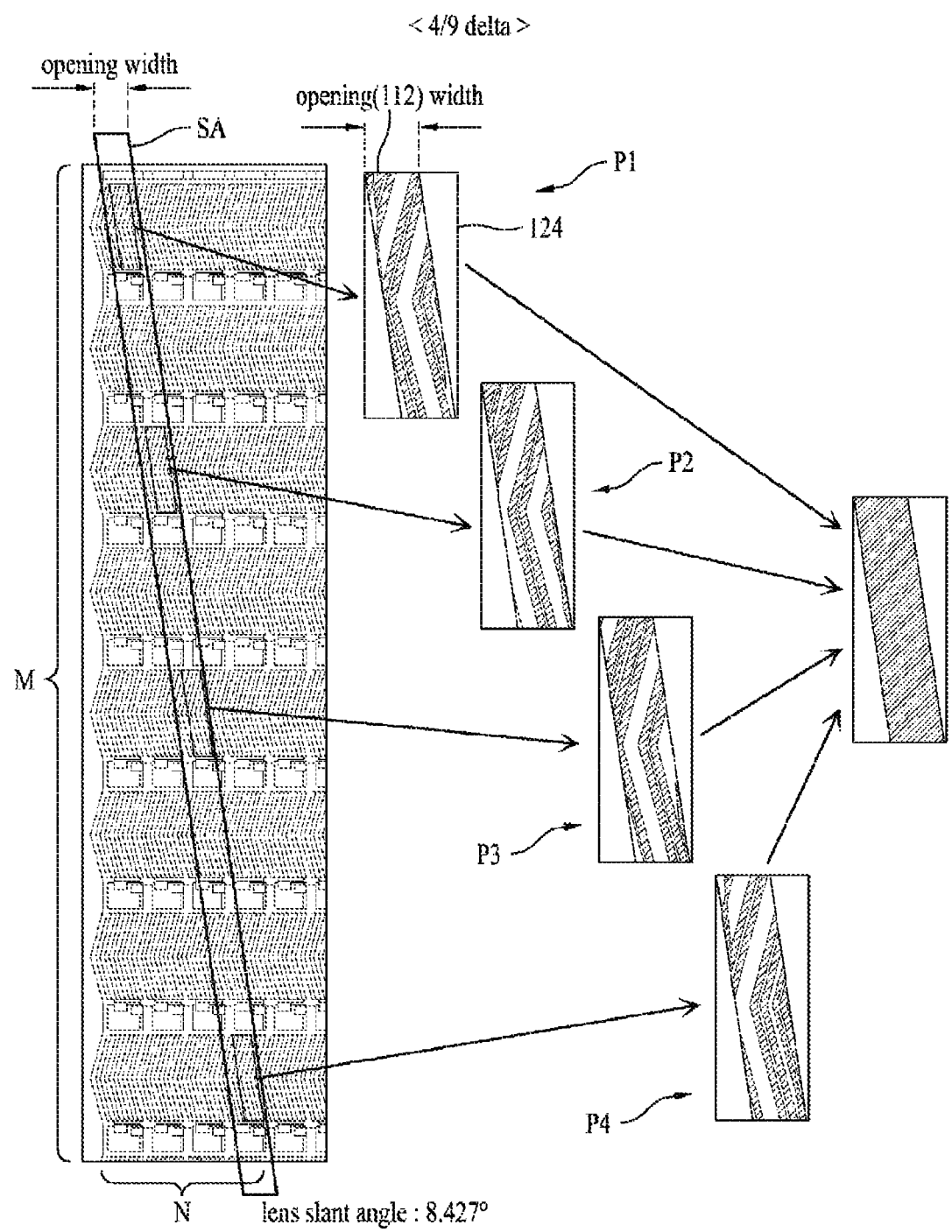
FIG. 6 illustrates an arrangement structure of pixels of a stereopsis display device according to the first embodiment of the present invention, wherein a view matrix is configured in a 4/9 delta mode and a plurality of different types of sub-pixels are overlapped with one another.

FIG. 6 illustrates a pixel arrangement of a stereopsis display device according to the first embodiment of the present invention, wherein a view matrix is configured in a ⅘ delta mode and a plurality of different types of sub-pixels are overlapped with one another to reduce a luminance difference within one viewing zone. In FIG. 6, a ratio of a horizontal width and a vertical width of each sub-pixel is set to 1:3 by way of example.

Referring to FIGS. 5 and 6, a second substrate 120 is a color filter array substrate that includes color filters, and includes a plurality of openings 122 overlapped on the plurality of sub-pixels. Each of the plurality of openings 122 has a shape for reducing or minimizing a 3D crosstalk, a luminance difference (LD) per viewing zone and a luminance difference (LD) in a viewing zone.

Each of the plurality of openings 122 arranged on the second substrate 120 defines an opening area of each sub-pixel. Each of the plurality of openings 122 is slanted at a given angle of θ from a vertical line and overlapped with a sub-pixel region of the first substrate 110. Each of the plurality of openings 122 may be arranged to have the same area as that of the sub-pixel region of the first substrate 110, or may be arranged to have an area smaller than that of the sub-pixel region of the first substrate 110. However, without limitation to the above arrangement, each of the plurality of openings 122 may be arranged to have an area greater than that of the sub-pixel region.

An area, shape and slant angle of each of the plurality of openings 122 are defined by the black matrix 124 that serves as a light-shielding layer. That is, the area, shape and slant angle of the opening 122 of each sub-pixel are defined depending on a patterning type of the black matrix 124 regardless of an area, shape and slant angle of each sub-pixel region arranged on the first substrate 110 of the liquid crystal panel 100.

The plurality of sub-pixel regions arranged on the first substrate 110 may have the same shape as that of the plurality of openings 122, or may have a shape different from that of the plurality of openings 122. That is, in the first embodiment of the present invention, the shape of the openings 122 is changed using the black matrix 124 arranged on the second substrate 120 regardless of the shape of the sub-pixel regions arranged on the first substrate 110. In this case, a luminance difference between the viewing zones and a luminance difference within each viewing zone can be reduced. However, without limitation to the above example, the area, shape and slant angle of each sub-pixel arranged on the first substrate 110 may be set to correspond to the area, shape and slant angle of each opening 122.

A length direction of each lenticular lens 310 is slanted at either the same angle as or an angle different from the slope θ of the opening 122. That is, the plurality of lenticular lenses 310 and openings 122 are arranged in parallel on the liquid crystal panel 100 to have an oblique shape slanted at a given slope θ. However, the slant angle of the lenticular lens 310 may be different from that of the opening 122.

In this case, the slant angle of the lenticular lens 310 may vary depending on an arrangement structure of the sub-pixels, which is intended to overlap the sub-pixels within one viewing zone.

The lenticular lens 310 may be arranged to be slanted at a first slant angle based on a vertical line, and the opening 122 may also be arranged to be slanted at the first slant angle by way of example.

Alternatively, the lenticular lens 310 may be arranged to be slanted at a first slant angle based on a vertical line, and the opening 122 may be arranged to be slanted at a second slant angle. In this case, the second slant angle of the opening 122 may be set such that the opening may be slanted within a range of ±3.5° with respect to the first slant angle of the lenticular lens 310. When the first slant angle of the lenticular lens 310 is set to be different from the second slant angle of the opening 122, a partial pixel region of another viewing zone adjacent to a corresponding viewing zone may be shown in the corresponding viewing zone in accordance with a view overlap mode. For example, an image of a first viewing zone may partially be shown in a second viewing zone, whereby a crosstalk of 3D image may partially be increased.

On the other hand, when the opening 122 is formed at the second slant angle of ±3.5° with respect to the first slant angle of the lenticular lens 310, a luminance difference (LD) between the viewing zones may be reduced in spite of a critical dimension (CD) difference of the black matrix 124, whereby the display quality of 3D images can be improved. As a result, the stereopsis display device according to the first embodiment of the present invention allows a viewer to view 3D images of high quality with three-dimensionality in a glassless mode.

Referring back to FIG. 6, one view matrix is comprised of M number of sub-pixels arranged in a first direction (e.g., vertical direction) and N number of sub-pixels arranged in a second direction (e.g., horizontal direction) to reduce a luminance difference within one viewing zone, wherein M and N are a positive integer. The openings 112 of the sub-pixels are arranged differently within one view matrix comprised of M×N number of sub-pixels, whereby the sub-pixels having their respective shapes different from one another are arranged in the same viewing zone (one view).

In more detail, the sub-pixels in FIG. 6 are arranged within a view matrix of an N/M delta mode, for example, 4/9 delta mode. In the 4/9 delta mode, four different types of sub-pixels P1, P2, P3 and P4 are arranged within a matrix where nine sub-pixels are arranged in a vertical direction and four sub-pixels are arranged in a horizontal direction.

In this case, openings 122 of the different types of sub-pixels P1, P2, P3 and P4 have the same shape and area as one another, but are arranged to be slanted at a given angle, whereby the pixel electrodes and the common electrodes of the first to fourth sub-pixels P1 to P4 are exposed in different shapes by the openings 122. As a result, the four sub-pixels overlapped within one view matrix have their respective shapes different from one another. That is, the pixel electrodes and the common electrodes arranged in the plurality of sub-pixels have the same layout but their exposed portions are different from one another due to the openings 122.

As four different types of sub-pixels P1, P2, P3 and P4 are overlapped with one another within one view matrix, low luminance portions and high luminance portions are mutually counterbalanced so that a uniform luminance is obtained within one viewing zone. That is, among nine sub-pixels arranged in one viewing zone, four different types of sub-pixels P1, P2, P3 and P4 are opened by the openings 122, and are overlapped with one another. The other five sub-pixels are covered by the black matrix 124.

As described above, when different types of sub-pixels arranged within one viewing zone are overlapped with one another, the pixel electrode and the common electrode of each sub-pixel, which may have a finger pattern, may be counterbalanced. As a result, a disclination at an edge portion of a domain in each sub-pixel may be counterbalanced, and a luminance difference between the respective sub-pixels due to a non-uniformity of liquid crystal (LC) driving within the respective sub-pixels may be counterbalanced. As a result, a luminance uniformity within one viewing zone can be improved.

For brevity, FIG. 6 illustrates some pixels in one view matrix. As illustrated, the view matrix of the 4/9 delta mode can be arranged repeatedly throughout the liquid crystal panel.

In this case, the slant angle SA of the lenticular lens 310 may be set by the following Equation 1.

$$SA = \tan^{-1}(N/3M) \quad [N, M: \text{natural number}, N<M] \quad \text{[Equation 1]}$$

In Equation 1, 'SA' means a slant angle of the lenticular lens 310, 'M' means a number of sub-pixels arranged within one view matrix in a first direction (e.g., vertical direction), and 'N' means a number of sub-pixels (or a number of sub-pixels having their respective shapes different from one another) arranged within one view matrix in a second direction (e.g., horizontal direction).

Equation 1 may be applied to a case where the liquid crystal panel has a resolution of 4K or 8K and one pixel is comprised of three colored R, G and B sub-pixels.

If view matrixes of a 4/9 delta mode are applied to a stereoscopic image display device having a screen size of 55 inches and a resolution of 4K or 8K and sub-pixels are arranged to be overlapped within each view matrix, a slant angle SA of the lenticular lens 310 can be set, for example, to 8.427°.

FIG. 7 shows a white luminance difference and a gray luminance difference when different types of sub-pixels are overlapped with one another in a view matrix of a 4/9 delta mode illustrated in FIG. 6.

Referring to FIG. 7, if sub-pixels are overlapped with one another in a 4/9 delta mode, four different types of sub-pixels P1, P2, P3 and P4 are overlapped with one another so that a luminance between the respective sub-pixels can be counterbalanced, and that a luminance difference within one viewing zone can be reduced.

In more detail, the experiments show that a white luminance difference is reduced to a level of 5.3%, and that a gray luminance difference is reduced to a level of 26.4%. This indicates that the viewer can view 3D images of high quality with three-dimensionality in a glassless mode.

The slant angle of the opening 122 and the slant angle of the lenticular lens 310 may vary depending on a size of the display panel. If the sub-pixels are overlapped with one another within the view matrix of the 4/9 delta mode and the slant angle SA of the lenticular lens 310 is set to 8.427°, a luminance difference LD between the viewing zones and a crosstalk CT can be maintained within acceptable ranges. Also, if the sub-pixels are overlapped with one another within the view matrix of the 4/9 delta mode and the slant angle SA of the lenticular lens 310 is set to 8.427°, a luminance difference LD within one viewing zone and a crosstalk CT can also be maintained within acceptable ranges. The display panel can be applied to various applications, such as a mobile device, a monitor, a notebook computer, and a large-scaled TV.

Figure 8:
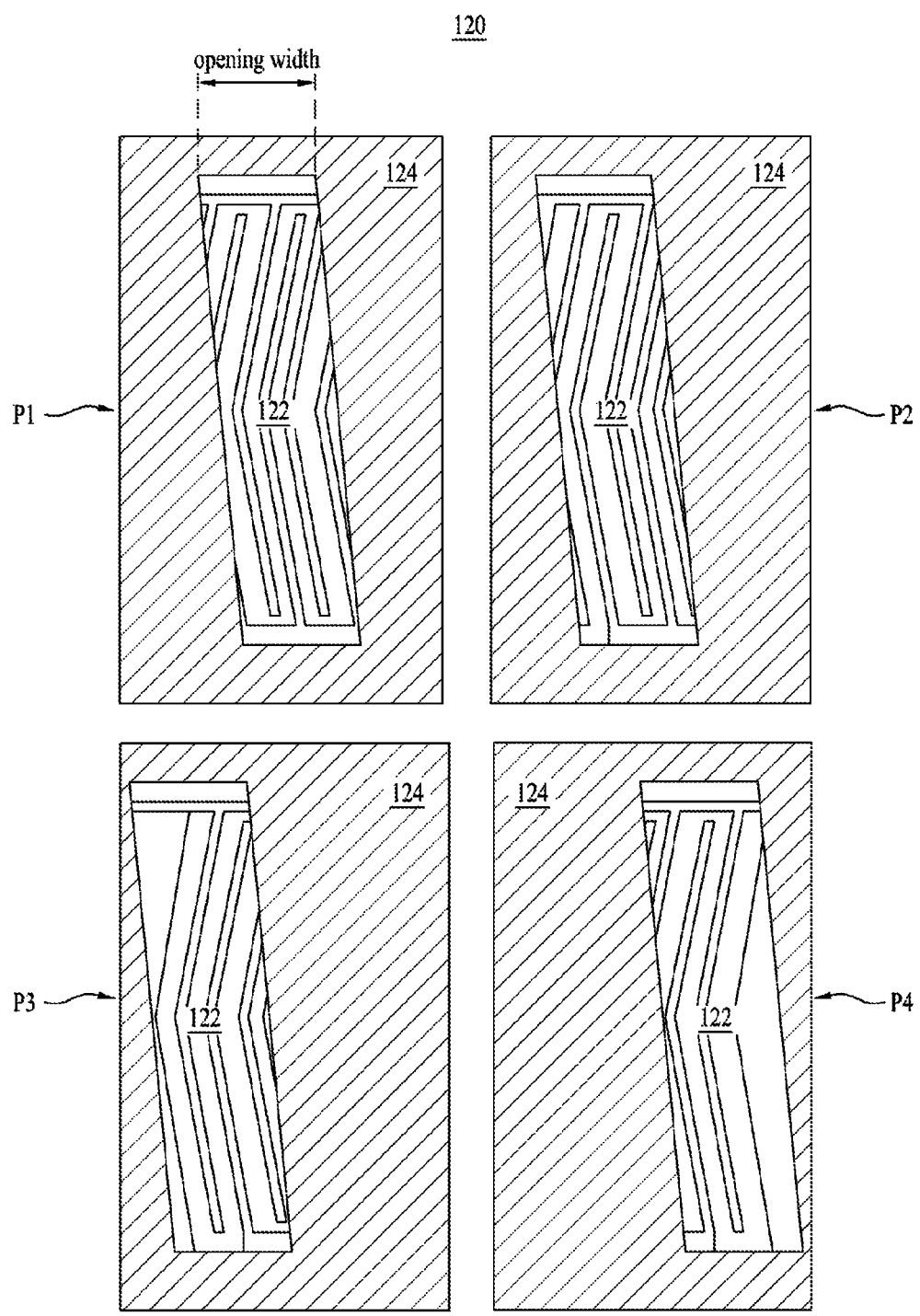
FIG. 8 is a diagram illustrating an example where, when sub-pixels are overlapped with one another in a view matrix of a 4/9 delta mode, four different types of sub-pixels are overlapped with one another, and an example of a method for forming four different types of sub-pixels.

FIG. 8 illustrates an example of four different types of sub-pixels that are overlapped with one another in a view matrix of a 4/9 delta mode illustrated in FIG. 6 and an exemplary method for forming such four different types of sub-pixels.

Referring to FIG. 8, the stereopsis display device according to the first embodiment of the present invention may arrange sub-pixels having their respective shapes different from one another even without changing a layout of the sub-pixels arranged on the first substrate 110 of the liquid crystal panel 100. In this case, the liquid crystal panel 100 has, for example, a screen size of 55 inches and a resolution of 4K.

In more detail, if the sub-pixels are overlapped with one another within a view matrix of a 4/9 delta mode, four of nine sub-pixels arranged in a vertical direction form the openings 122, and the other five sub-pixels are covered by the black matrix 124. Among the nine sub-pixels, four sub-pixels opened (exposed) by the openings 122 and the five sub-pixels covered by the black matrix 124 are arranged repeatedly at a given pattern. As a result, the four sub-pixels opened (exposed) by the openings 122 and the five sub-pixels covered by the black matrix 124 are arranged uniformly on an entire screen of the liquid crystal panel. That is, the view matrix of the 4/9 delta mode is arranged repeatedly within the liquid crystal panel.

In this case, a patterning type of the black matrix 124 may be varied to move a position, in which the openings of the first to fourth sub-pixels P1 to P4 are formed, to a left and right direction, whereby the openings 122 of the respective sub-pixels may be arranged differently. By doing so, if the positions where the openings 122 of the sub-pixels are arranged are different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the pixels opened (exposed) by the openings 122 where the black matrix 1224 is not arranged have different shapes such that four different types of sub-pixels P1, P2, P3 and P4 may be arranged within one view matrix.

In this case, even though the openings 122 of the first to fourth sub-pixels P1 to P4 have the same shape, if the openings 122 are arranged to be slanted at a given angle, the pixel electrodes and the common electrodes of the first to fourth sub-pixels P1 to P4 are exposed by the openings 122 in their respective shapes different from one another. As a result, the shapes of the four sub-pixels overlapped within one view matrix are different from one another so that a luminance difference of the respective sub-pixels due to non-uniformity of LC driving within each sub-pixel can be counterbalanced, and that a luminance uniformity within one viewing zone can be improved.

The given slant angle of the opening 122 may be the same as the slant angle of the lenticular lens 310. However, without limitation to this example, the given slant angle of the opening 122 may be different from the slant angle of the lenticular lens 310 within the range of ±3.5°.

As described above, if four different types of sub-pixels P1, P2, P3 and P4 are overlapped with one another, low luminance portions and high luminance portions are mutually counterbalanced so that a uniform luminance can be obtained within one viewing zone (one view). That is, four different types of sub-pixels P1, P2, P3 and P4 arranged in one viewing zone are overlapped with one another so that a luminance difference of the respective sub-pixels can be counterbalanced, and that thus, a uniformity of luminance within one viewing zone can be improved. In this case, the openings of the four different types of sub-pixels have their respective positions different from one another in the pixel region but have the same area as one another.

If the stereoscopic image display device according to the first embodiment of the present invention has a screen size of 55 inches and a resolution of 4K, one sub-pixel may have a size of 105 um (horizontal)×315 um (vertical). At this time, if a view matrix of a 4/9 delta mode is used, the horizontal width of the opening 122 of each sub-pixel may be 46.667 um (105 um×4/9).

Figure 9:
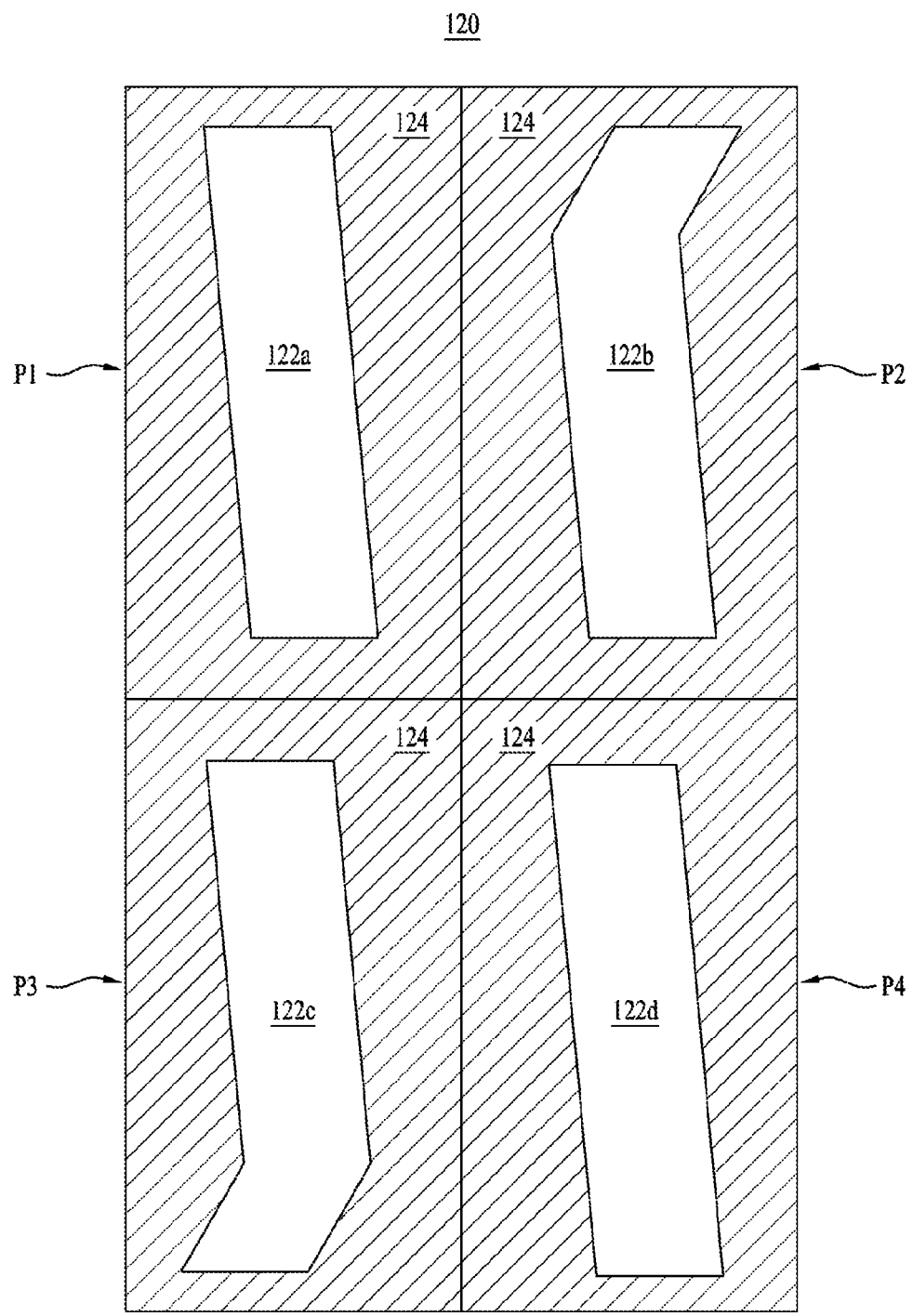
FIG. 9 is a diagram illustrating another example where, when sub-pixels are overlapped with one another in a view matrix of a 4/9 delta mode, four different types of sub-pixels are overlapped with one another, and an example of a method for forming four different types of sub-pixels.

FIG. 9 illustrates an example of four different types of sub-pixels that are overlapped with one another in a view matrix of a 4/9 delta mode illustrated in FIG. 6 and an exemplary method for forming such four different types of sub-pixels.

Referring to FIG. 9, the stereopsis display device according to the first embodiment of the present invention may arrange sub-pixels having their respective shapes different from one another even without changing a layout of the sub-pixels arranged on the first substrate 110 of the liquid crystal panel 100.

In more detail, if the sub-pixels are overlapped with one another within a view matrix of a 4/9 delta mode, four of nine sub-pixels arranged in a vertical direction form openings 122a, 122b, 122c and 122d, and the other five sub-pixels are covered by the black matrix 124. In this case, a patterning type of the black matrix 124 may vary, whereby the openings 122a, 122b, 122c and 122d of the first to fourth sub-pixels P1 to P4 may have their respective shapes different from one another.

By doing so, if the shapes of the openings 122a, 122b, 122c and 122d of the four sub-pixels are different from one another, the pixel electrodes and the common electrodes of the first substrate corresponding to the openings 122a, 122b, 122c and 122d of the respective sub-pixels are arranged differently. That is, even though the pixel electrodes and the common electrodes of the sub-pixels arranged on the first substrate have the same layout, the pixel electrodes and the common electrodes of the sub-pixels opened (exposed) by the openings 122a, 122b, 122c and 122d have different shapes. As a result, four different types of sub-pixels P1, P2, P3 and P4 may be arranged within one view matrix.

As described above, if four different types of sub-pixels P1, P2, P3 and P4 are overlapped with one another, their low luminance portions and high luminance portions are mutually counterbalanced, whereby a uniform luminance is obtained within one viewing zone. That is, four different types of sub-pixels P1, P2, P3 and P4 arranged in one viewing zone are overlapped with one another so that a luminance difference of the respective sub-pixels can be counterbalanced, and that thus, a uniformity of luminance within one viewing zone can be improved. In this case, the openings of the 4 different types of sub-pixels P1, P2, P3 and P4 have their respective shapes different from one another but have the same area as one another.

The stereopsis display device according to the first embodiment of the present invention may reduce a luminance difference LD within one viewing zone by changing a design of the black matrix 124 of the second substrate 120. When the stereopsis display device according to the first embodiment of the present invention is applied to a glasses-free stereopsis display device, 3D images of high quality can be provided to a viewer. Also, various 3D display devices can be developed without incurring a substantial cost, as a simple design change can improve performance.

Figure 10:
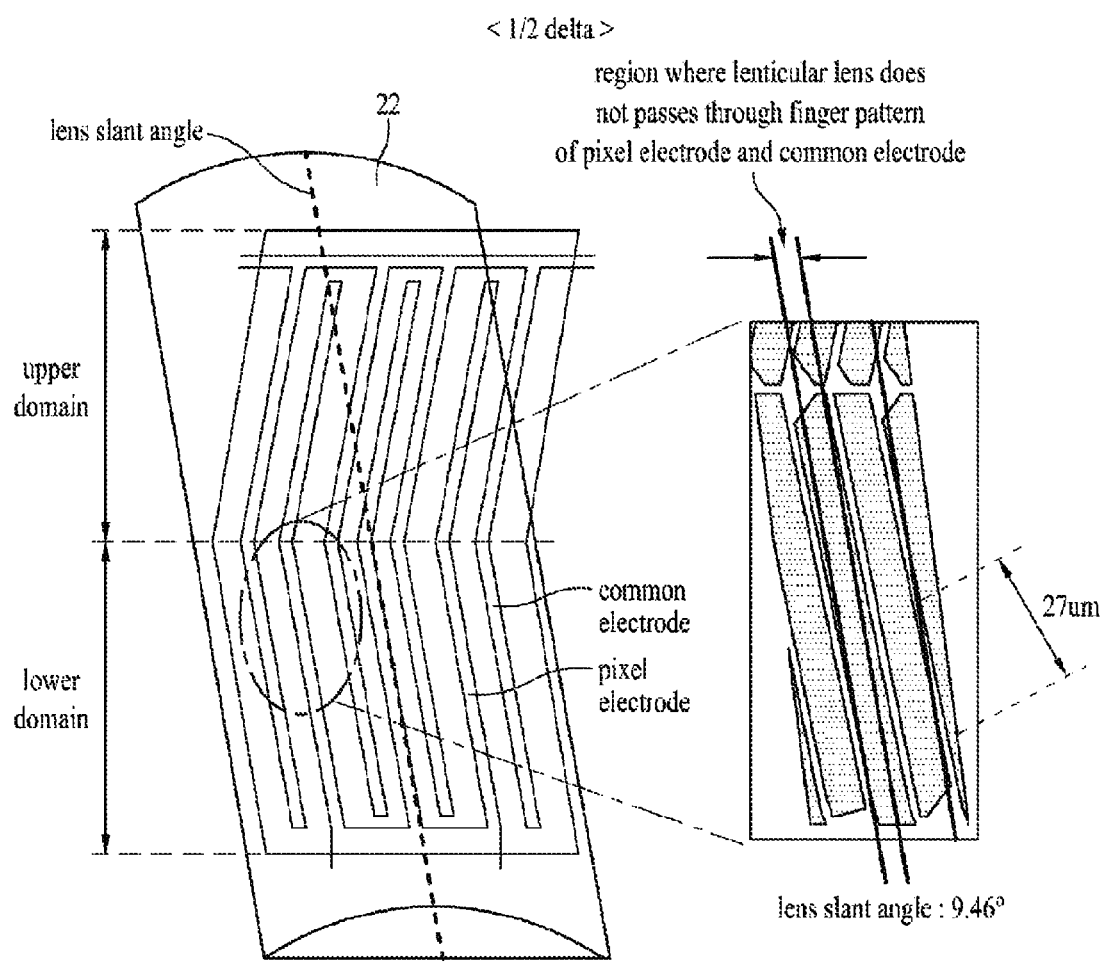
FIG. 10 is a diagram illustrating an overlap of sub-pixels in a view matrix of a ½ delta mode and a slant angle of a lenticular lens.

FIG. 10 is a diagram that illustrates an overlap of sub-pixels in a view matrix of a ½ delta mode and a slant angle of a lenticular lens. FIG. 14 shows a white luminance difference and a gray luminance difference when different types of sub-pixels are overlapped with one another in view matrixes of a ½ delta mode, a ⅓ delta mode, a ⅘ delta mode, a 9/22 delta mode and a 25/62 delta mode.

Referring to FIGS. 10 and 14, if a ratio of a horizontal width and a vertical width of each sub-pixel is set to 1:3 and the sub-pixels are arranged within a view matrix of a ½ delta mode, a slant angle of the lenticular lens may be set to tan−1 ⅙ (9.46°).

If the view matrix of the ½ delta mode is applied, there is a region where a virtual line corresponding to the slant angle of the lenticular lens does not pass through a finger pattern of a pixel electrode and a common electrode. In this case, there is a region inside the pixels arranged in one viewing zone where a high transmittance of light exists, whereby a luminance line may be shown. As shown in FIG. 14, if the view matrix of the ½ delta mode is applied to a liquid crystal panel of a 8K resolution, a white luminance difference is 72.2%, and a gray luminance difference is 81.9%.

Figure 11:
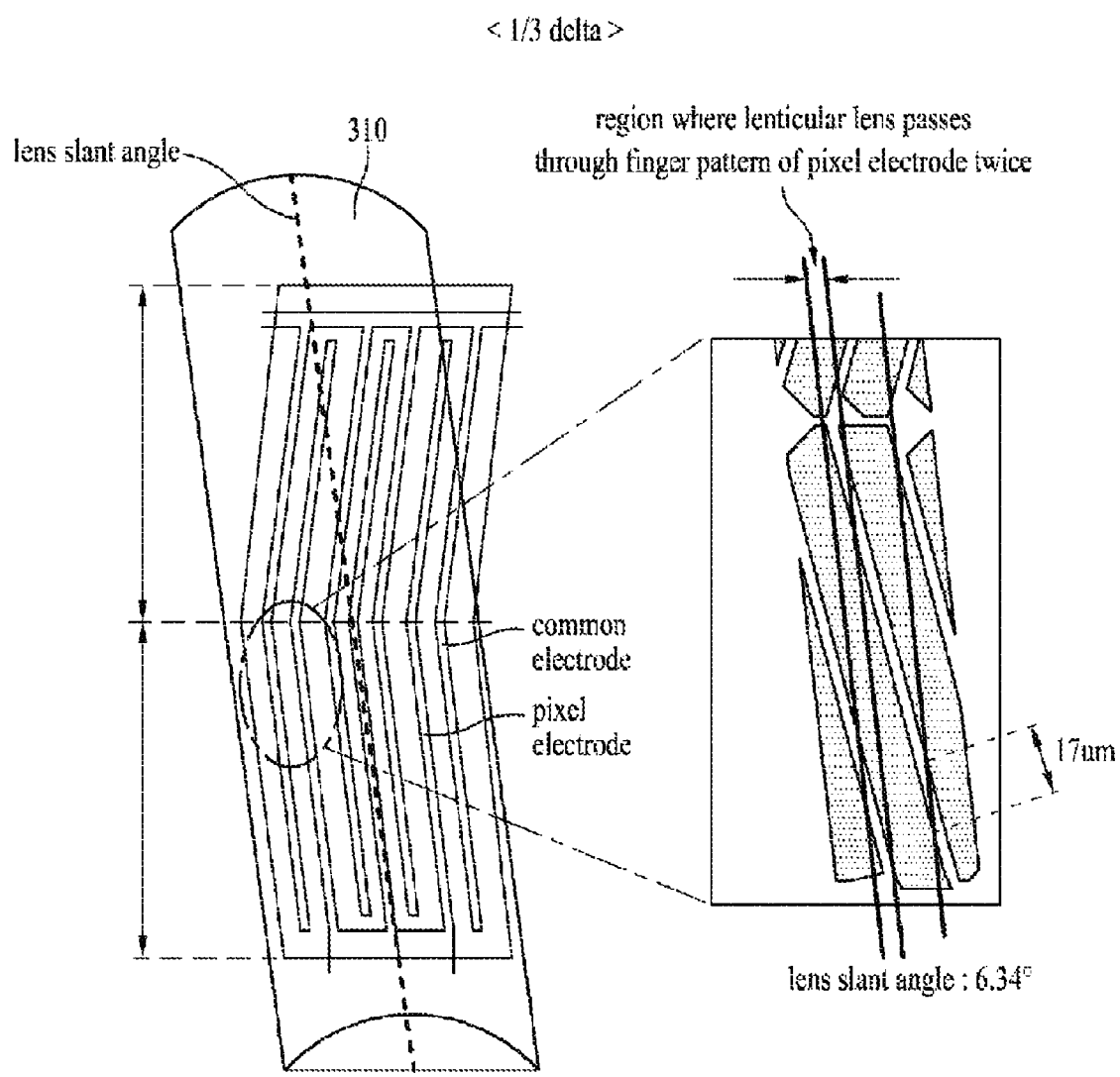
FIG. 11 is a diagram illustrating an overlap of sub-pixels in a view matrix of a ⅓ delta mode and a slant angle of a lenticular lens.

FIG. 11 is a diagram that illustrates an overlap of sub-pixels in a view matrix of a ⅓ delta mode and a slant angle of a lenticular lens.

Referring to FIGS. 11 and 14, if a ratio of a horizontal width and a vertical width of each sub-pixel is set to 1:3 and the sub-pixels are arranged within a view matrix of a ⅓ delta mode, a slant angle of the lenticular lens may be set to tan−1⅑ (6.34°).

If the view matrix of the ⅓ delta mode is used, there is a region where a virtual line corresponding to the slant angle of the lenticular lens passes through twice a finger pattern of a pixel electrode and a common electrode. In this case, there is a region inside sub-pixels arranged in viewing zones where a low transmittance of light exists, whereby a dark line may be shown. As shown in FIG. 14, if the view matrix of the ⅓ delta mode is applied to a liquid crystal panel of a 8K resolution, a white luminance difference is 50.5%, and a gray luminance difference is 75.3%.

As shown in FIGS. 10 and 11, a region where a high transmittance of light and a region where a low transmittance of light exist in the sub-pixels arranged in one viewing zone, and if the sub-pixels are overlapped, a luminance difference LD may occur and the display quality of 3D images may deteriorate.

To address the aforementioned problems, the inventors of the present application have performed various experiments. Hereinafter, a stereopsis display device according to the second and third embodiments of the present invention will be described with an example of a liquid crystal panel having a 8K resolution.

Figure 12:
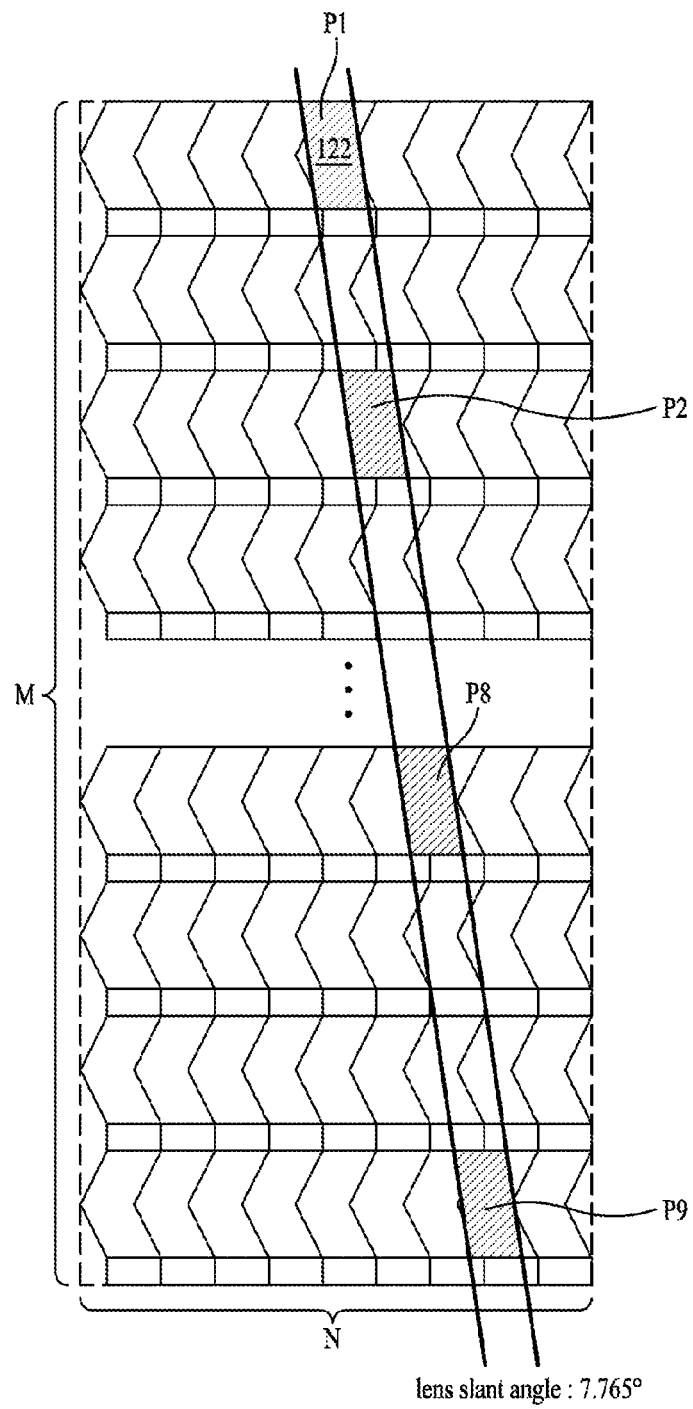
FIG. 12 illustrates an arrangement structure of pixels of a stereopsis display device according to the second embodiment of the present invention, wherein sub-pixels are overlapped with one another in a view matrix of a 9/22 delta mode.

FIG. 12 illustrates an arrangement structure of sub-pixels of a stereopsis display device according to the second embodiment of the present invention, wherein the sub-pixels are overlapped with one another in a view matrix of a 9/22 delta mode to reduce a luminance difference within one viewing zone.

Referring to FIG. 12, the sub-pixels are overlapped with one another in a view matrix of a 9/22 delta mode to reduce a luminance difference within one viewing zone. In FIG. 12, a ratio of a horizontal width and a vertical width of each sub-pixel is set to 1:3 by way of example.

Each of a plurality of openings 122 arranged on a second substrate 120 defines an opening area of the sub-pixel. Each opening 122 is slanted at a given angle of θ from a vertical line and overlapped with each sub-pixel region of a first substrate. Each opening 122 may be arranged to have the same area as that of the sub-pixel region of the first substrate, or may be arranged to have an area smaller than that of the sub-pixel region of the first substrate. However, without limitation to the above arrangement, each opening 122 may be arranged to have an area greater than that of the sub-pixel region of the first substrate.

An area, shape and slant angle of each opening 122 are defined by a black matrix BM that serves as a light-shielding layer. That is, the area, shape and slant angle of the opening 122 of each sub-pixel are defined depending on a patterning type of the black matrix, regardless of an area, shape and slant angle of each sub-pixel region arranged on the first substrate of the liquid crystal panel. As a result, the plurality of sub-pixel regions arranged on the first substrate may have the same shape as that of the plurality of openings 122.

Meanwhile, the plurality of sub-pixel regions arranged on the first substrate may have a shape different from that of the plurality of openings 122. That is, in the second embodiment of the present invention, the shape of the openings 122 is changed using the black matrix arranged on the second substrate, regardless of the shape of the sub-pixel regions arranged on the first substrate, whereby a luminance difference between the viewing zones and a luminance difference within each viewing zone can be reduced. However, without limitation to the above example, the area, shape and slant angle of each sub-pixel region arranged on the first substrate 110 may be set to correspond to the area, shape and slant angle of each opening 122.

Each lenticular lens 310 is slanted based on its length direction at either the same angle as or an angle different from the slope θ of the opening 122. That is, the plurality of lenticular lenses 310 and openings 122 may be arranged in parallel on the liquid crystal panel to have an oblique shape slanted at a given slope θ. At this time, the slant angle of the lenticular lens 310 may be the same as or different from that of the opening 122.

The lenticular lens 310 may be slanted at a first slant angle based on a vertical line, and the opening 122 may be arranged to be slanted at the first slant angle by way of example.

Alternatively, the lenticular lens 310 may be slanted at a first slant angle based on a vertical line, and the opening 122 may be arranged to be slanted at a second slant angle. At this time, the first slant angle is different from the second slant angle. In this case, the second slant angle of the opening 122 may be set such that the opening 122 may be slanted at an angle of maximum ±3.5° with respect to the first slant angle of the lenticular lens 310. When the first slant angle of the lenticular lens 310 is set to be different from the second slant angle of the opening 122, a partial pixel region of another viewing zone adjacent to a corresponding viewing zone may be shown in the corresponding viewing zone in accordance with a view overlap mode. For example, an image of a first viewing zone may partially be shown in a second viewing zone, whereby a crosstalk of 3D image may partially be increased.

On the other hand, when the opening 122 is formed at the second slant angle of maximum ±3.5° with respect to the first slant angle of the lenticular lens 310, a luminance difference LD between the viewing zones may be reduced in spite of a critical dimension CD difference of the black matrix 124. As a result, the stereopsis display device according to the second embodiment of the present invention allows a viewer to view 3D images of high quality with three-dimensionality in a glassless mode.

In more detail, in FIG. 12, the sub-pixels are arranged within a view matrix of a 9/22 delta mode. In the 9/22 delta mode, twenty two sub-pixels are arranged in a vertical direction and nine sub-pixels are arranged in a horizontal direction, whereby one view matrix is configured with nine different types of sub-pixels P1 to P9 within the view matrix of the 9/22 delta mode.

If nine different types of sub-pixels P1 to P9 are arranged within one view matrix, the sub-pixels P1 to P9 are overlapped with one another, whereby low luminance portions and high luminance portions are mutually counterbalanced and a uniform luminance can be thus obtained within one viewing zone. That is, as nine different types of sub-pixels P1 to P9 are overlapped with one another, a pixel electrode and a common electrode of each sub-pixel, which may have a finger pattern, may be counterbalanced. As a result, a disclination at an edge portion of a domain in each sub-pixel may be counterbalanced, and a luminance difference of the respective sub-pixels due to non-uniformity of liquid crystal (LC) driving within the respective sub-pixels may be counterbalanced and a luminance uniformity within one viewing zone can be improved. Some of the nine different types of sub-pixels may have the same shape.

FIG. 12 illustrates some pixels in one view matrix. As illustrated, the view matrix of the 9/22 delta mode may be arranged repeatedly on the liquid crystal panel.

If view matrixes of the 9/22 delta mode are applied to a stereoscopic image display device having a screen size of 55 inches and a resolution of 8K, the slant angle SA of the lenticular lens 310 may be set to 7.765° in accordance with Equation 1 described above.

Referring to FIG. 14, if sub-pixels are overlapped with one another within a view matrix of the 9/22 delta mode, nine different types of sub-pixels P1 to P9 are overlapped with one another so that a luminance between the respective sub-pixels can be counterbalanced and a luminance difference within one viewing zone can be reduced. In more detail, a white luminance difference is reduced to a level of 3.31%, and a gray luminance difference is reduced to a level of 15.76%. As a result, the viewer can view 3D images of high quality with three-dimensionality in a glassless mode.

The slant angle of the opening 122 and the slant angle of the lenticular lens 310 may vary depending on a size of the display panel. If the sub-pixels are overlapped with one another within the view matrix of the 9/22 delta mode and the slant angle SA of the lenticular lens 310 is set to 7.765°, a luminance difference LD between the viewing zones and a crosstalk CT can be maintained with acceptable ranges. Also, if the sub-pixels are overlapped with one another within the view matrix of the 9/22 delta mode and the slant angle SA of the lenticular lens 310 is set to 7.765°, a luminance difference LD within one viewing zone and a crosstalk CT can also be maintained within acceptable ranges. This display panel can be applied to various applications, such as a mobile device, a monitor, a notebook computer, and a large-scaled TV.

The stereopsis display device according to the second embodiment of the present invention may arrange sub-pixels having their respective shapes different from one another even without changing a layout of the sub-pixels arranged on the first substrate of the liquid crystal panel.

In more detail, if the sub-pixels are overlapped with one another within the view matrix of the 9/22 delta mode, nine of twenty two sub-pixels arranged in a vertical direction form the openings 122 and the other thirteen sub-pixels are covered by the black matrix 124 in accordance with the method illustrated in FIG. 8. Among the twenty two sub-pixels, nine sub-pixels opened (exposed) by the openings 122 and the thirteen sub-pixels covered by the black matrix 124 are arranged repeatedly in a given pattern. As a result, the nine sub-pixels opened (exposed) by the openings 122 and the thirteen sub-pixels covered by the black matrix 124 are arranged uniformly on an entire screen of the liquid crystal panel.

In this case, a patterning type of the black matrix 124 vary to move a position, in which the openings of the first to ninth sub-pixels P1 to P9 are formed, to a left and right direction, whereby the openings 122 of the respective sub-pixels may be arranged differently. By doing so, if the positions where the openings 122 of the sub-pixels are arranged are different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the pixel electrodes and the common electrodes of the respective sub-pixels opened (exposed) by the openings 122 have their respective shapes different from one another. As a result, nine different types of sub-pixels P1 to P9 may be arranged within one view matrix.

As described above, if nine different types of sub-pixels P1 to P9 are overlapped with one another, low luminance portions and high luminance portions of the 9 sub-pixels P1 to P9 are mutually counterbalanced, whereby a uniform luminance is obtained within one viewing zone. That is, nine different types of sub-pixels P1 to P9 arranged in one viewing zone are overlapped with one another, whereby a luminance difference of the respective sub-pixels can be counterbalanced and thus, a uniformity of luminance within one viewing zone can be improved.

Alternatively, different types of sub-pixels may be arranged using the method illustrated in FIG. 9, even though the layout of the sub-pixels arranged on the first substrate 110 of the liquid crystal panel 100 is not changed.

In more detail, if the sub-pixels are overlapped with one another within the view matrix of the 9/22 delta mode, nine of twenty two sub-pixels arranged in a vertical direction only form the openings 122 and the other thirteen sub-pixels are covered by the black matrix 124. In this case, a patterning type of the black matrix 124 may vary, whereby the openings of the first to ninth sub-pixels P1 to P9 may have their respective shapes different from one another. By doing so, if the openings 122 of the nine sub-pixels have their respective shapes different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the sub-pixels opened (exposed) by the openings 122 have their respective shapes different from one another, whereby nine different types of sub-pixels P1 to P9 may be arranged within one view matrix.

As described above, if nine different types of sub-pixels P1 to P9 are overlapped with one another, low luminance portions and high luminance portions of the 9 sub-pixels P1 to P9 are mutually counterbalanced, whereby a uniform luminance can be obtained within one viewing zone. That is, nine different types of sub-pixels P1 to P9 arranged in one viewing zone are overlapped with one another, whereby a luminance difference of the respective sub-pixels can be counterbalanced and thus, a uniformity of luminance within one viewing zone can be improved. As a result, if the stereopsis display device according to the second embodiment of the present invention is applied to a glasses-free stereopsis display device, 3D images of high quality can be provided to a viewer. Also, various 3D display devices can be developed without incurring a substantial cost, as a simple design change can improve performance.

Figure 13:
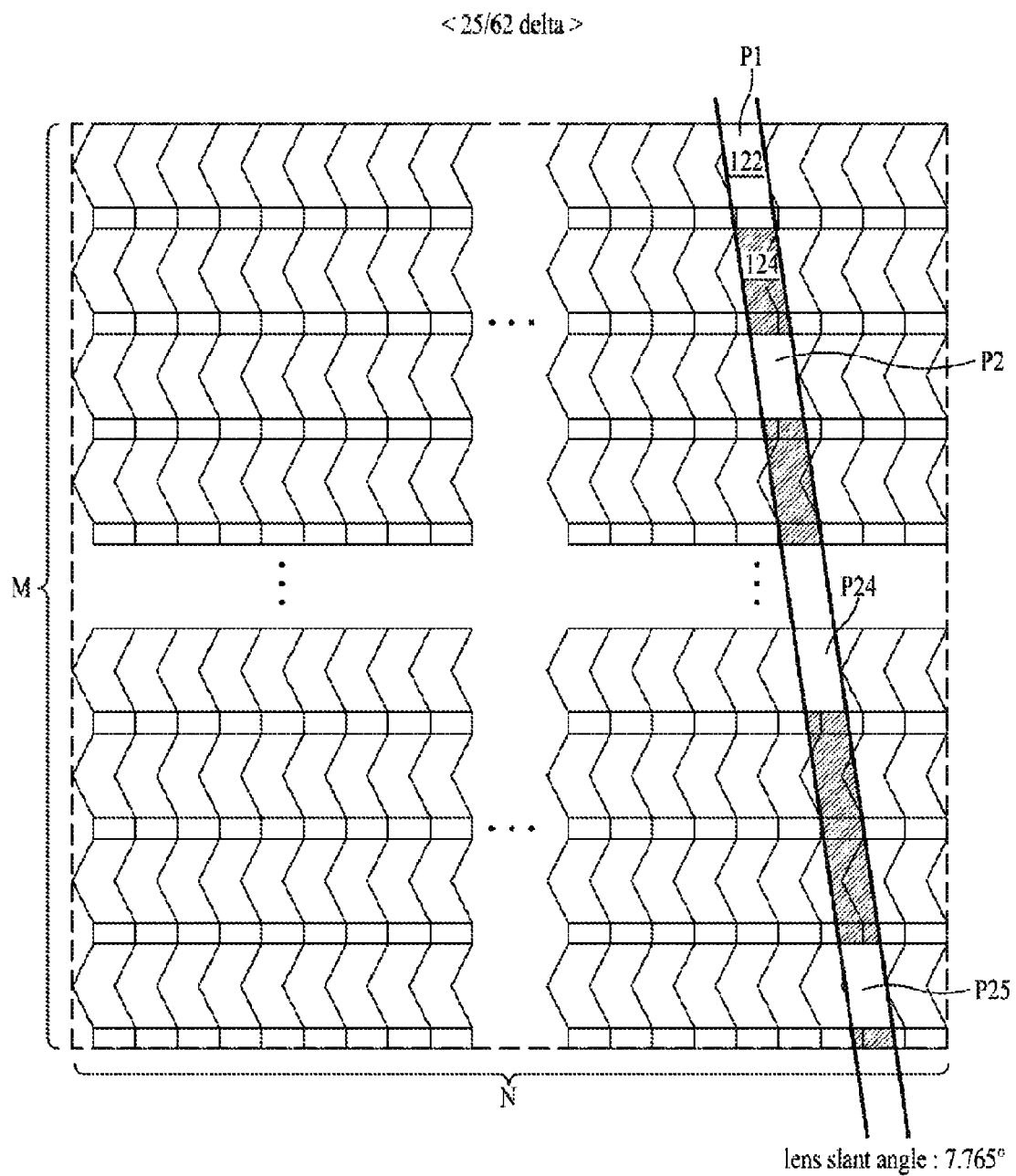
FIG. 13 illustrates an arrangement structure of pixels of a stereopsis display device according to the third embodiment of the present invention, wherein sub-pixels are overlapped with one another in a view matrix of a 25/62 delta mode.

FIG. 13 illustrates an arrangement structure of pixels of a stereopsis display device according to the third embodiment of the present invention, wherein sub-pixels are overlapped with one another in a view matrix of a $25/62$ delta mode to reduce a luminance difference within one viewing zone.

Referring to FIG. 13, the sub-pixels are overlapped with one another in a view matrix of a $25/62$ delta mode to reduce a luminance difference within one viewing zone. In FIG. 13, a ratio of a horizontal width and a vertical width of each sub-pixel is set to 1:3 by way of example.

Each of a plurality of openings 122 arranged on the second substrate defines an opening area of each sub-pixel. Each opening 122 is slanted at a given angle of θ from a vertical line and overlapped with each sub-pixel region of the first substrate. Each opening 122 may be arranged to have the same area as that of the sub-pixel region of the first substrate, or may be arranged to have an area smaller than that of the sub-pixel region of the first substrate. However, without limitation to the above arrangement, each opening 122 may be arranged to have an area greater than that of the sub-pixel region of the first substrate.

An area, shape and slant angle of each opening 122 are defined by a black matrix that serves as a light-shielding layer. That is, the area, shape and slant angle of the opening 122 of each sub-pixel are defined depending on a patterning type of the black matrix, regardless of an area, shape and slant angle of each sub-pixel region arranged on the first substrate of the liquid crystal panel.

As a result, the plurality of sub-pixel regions arranged on the first substrate may have the same shape as that of the plurality of openings 122, or may have a shape different from that of the plurality of openings 122. That is, in the third embodiment of the present invention, the shape of the openings 122 is changed using the black matrix arranged on the second substrate, regardless of the shape of the sub-pixel regions arranged on the first substrate, whereby a luminance difference between the viewing zones and a luminance difference within each viewing zone can be reduced. However, without limitation to the above example, the area, shape and slant angle of each sub-pixel arranged on the first substrate 110 may be set to correspond to the area, shape and slant angle of each opening 122.

Each lenticular lens 310 is slanted based on its length direction at either the same angle as or an angle different from the slope θ of the opening 122. That is, the plurality of lenticular lenses 310 and openings 122 may be arranged in parallel on the liquid crystal panel to have an oblique shape slanted at a given slope θ. At this time, the slant angle of the lenticular lens 310 may be the same as or different from that of the opening 122.

The lenticular lens 310 may be arranged to be slanted at a first slant angle based on a vertical line, and the opening 122 may be arranged to be slanted at the first slant angle by way of example.

Alternatively, the lenticular lens 310 may be slanted at a first slant angle based on a vertical line, and the opening 122 may be slanted at a second slant angle. At this time, the first slant angle is different from the second slant angle. In this case, the second slant angle of the opening 122 may be set such that the opening may be slanted at an angle of maximum ±3.5° with respect to the first slant angle of the lenticular lens 310. By doing so, if the first slant angle of the lenticular lens 310 is set to be different from the second slant angle of the opening 122, a partial sub-pixel region of another viewing zone adjacent to a corresponding viewing zone may be shown in the corresponding viewing zone in accordance with a view overlap mode. For example, an image of a first viewing zone may partially be shown in a second viewing zone, whereby a crosstalk of 3D image may partially be increased.

On the other hand, if the opening 122 is formed at the second slant angle of maximum ±3.5° with respect to the first slant angle of the lenticular lens 310, a luminance difference LD between the viewing zones may be reduced in spite of a critical dimension CD difference of the black matrix 124. Thus, the display quality of 3D image may be improved. As a result, the stereopsis display device according to the embodiment of the present invention allows a viewer to view 3D images of high quality with three-dimensionality in a glassless mode.

In more detail, in FIG. 13, the sub-pixels are arranged within a view matrix of a $25/62$ delta mode. In the $25/62$ delta mode, sixty two sub-pixels are arranged in a vertical direction and twenty five sub-pixels are arranged in a horizontal direction, whereby one view matrix is configured with twenty five different types of sub-pixels P1 to P25 within one view matrix.

If twenty five different types of sub-pixels P1 to P25 are arranged within one view matrix, the sub-pixels P1 to P25 are overlapped with one another, whereby low luminance portions and high luminance portions are mutually counterbalanced, whereby a uniform luminance is obtained within one viewing zone. That is, if twenty five different types of sub-pixels P1 to P25 are overlapped with one another, a pixel electrode and a common electrode of each sub-pixel, which may have a finger pattern, may be counterbalanced. As a result, a disclination at an edge portion of a domain in each sub-pixel may be counterbalanced, and a luminance difference of the respective sub-pixels due to non-uniformity of liquid crystal (LC) driving within the respective sub-pixels, may be counterbalanced and a luminance uniformity within one viewing zone can be improved.

FIG. 13 illustrate some pixels in one view matrix. As illustrated, the view matrix of the $25/62$ delta mode can be arranged repeatedly on the liquid crystal panel.

If view matrixes of the $25/62$ delta mode are applied to a stereoscopic image display device having a screen size of 55 inches and a resolution of 4K or 8K, the slant angle SA of the lenticular lens 310 may be set to 7.655° in accordance with Equation 1 described above.

Referring to FIG. 14, if sub-pixels are overlapped with one another within a view matrix of the $^{25}\!/_{62}$ delta mode, twenty five different types of sub-pixels P1 to P25 are overlapped with one another, whereby a luminance between the respective sub-pixels can be counterbalanced and a luminance difference within one viewing zone can be reduced. In more detail, a white luminance difference is reduced to a level of 8.7%, and a gray luminance difference is reduced to a level of 10.9%. As a result, the viewer can view 3D images of high quality with three-dimensionality in a glassless mode.

The slant angle of the opening 122 and the slant angle of the lenticular lens 310 may vary depending on a size of the display panel. If the sub-pixels are overlapped with one another within the view matrix of the $^{25}\!/_{62}$ delta mode and the slant angle SA of the lenticular lens 310 is set to 7.655°, a luminance difference LD between the viewing zones and a crosstalk CT can be maintained within acceptable ranges. Also, if the sub-pixels are overlapped with one another within the view matrix of the $^{25}\!/_{62}$ delta mode and the slant angle SA of the lenticular lens 310 is set to 7.655°, a luminance difference LD within one viewing zone and a crosstalk CT can also be maintained within acceptable ranges. This display panel can be applied to various applications, such as a mobile device, a monitor, a notebook computer, and a large-scaled TV.

The stereopsis display device according to the third embodiment of the present invention may arrange sub-pixels having their respective shapes different from one another even without changing a layout of pixel electrodes and common electrodes of the sub-pixels arranged on the first substrate of the liquid crystal panel.

In more detail, if the sub-pixels are overlapped with one another within the view matrix of the $^{25}\!/_{62}$ delta mode, twenty five of sixty two sub-pixels arranged in a vertical direction form the openings 122 and the other thirty seven sub-pixels are covered by the black matrix 124 in accordance with the method illustrated in FIG. 8. Among the sixty two sub-pixels, twenty five sub-pixels opened (exposed) by the openings 122 and the thirty seven sub-pixels covered by the black matrix 124 are arranged repeatedly in a given pattern. As a result, the twenty five sub-pixels opened (exposed) by the openings 122 and the thirty seven sub-pixels covered by the black matrix 124 are arranged uniformly on an entire screen of the liquid crystal panel.

In this case, a patterning type of the black matrix 124 may vary to move a position, in which the openings of the first to twenty-fifth sub-pixels P1 to P25 are formed, to a left and right direction, whereby the openings 122 of the respective sub-pixels may be arranged differently. By doing so, if the positions where the openings 122 of the sub-pixels are arranged are different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the pixel electrodes and the common electrodes of the respective sub-pixels opened (exposed) by the openings 122 have their respective shapes different from one another. As a result, twenty five different types of sub-pixels P1 to P25 may be arranged within one view matrix.

As described above, if twenty five different types of sub-pixels P1 to P25 are overlapped with one another, low luminance portions and high luminance portions of the twenty five sub-pixels P1 to P25 are mutually counterbalanced, whereby a uniform luminance can be obtained within one viewing zone. That is, twenty five different types of sub-pixels P1 to P25 arranged in one viewing zone are overlapped with one another, whereby a luminance difference of the respective sub-pixels can be counterbalanced and thus, a uniformity of luminance within one viewing zone can be improved.

Alternatively, different types of sub-pixels may be arranged using the method illustrated in FIG. 9 even though the layout of the sub-pixels arranged on the first substrate 110 of the liquid crystal panel 100 is not changed.

In more detail, if the sub-pixels are overlapped with one another within the view matrix of the $^{25}\!/_{62}$ delta mode, twenty five of sixty two sub-pixels arranged in a vertical direction only form the openings 122 and the other thirty seven sub-pixels are covered by the black matrix 124. In this case, a patterning type of the black matrix 124 may vary, whereby the openings of the first to twenty-fifth sub-pixels P1 to P25 may have their respective shapes different from one another. By dong so, if the openings 122 of the twenty five sub-pixels have their respective shapes different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the pixel electrodes and the common electrodes of the sub-pixels opened (exposed) by the openings 122 have their respective shapes different from one another such that twenty five different types of sub-pixels may be arranged within one view matrix.

As described above, if twenty five different types of sub-pixels P1 to P25 are overlapped with one another, low luminance portions and high luminance portions of the twenty five sub-pixels P1 to P25 are mutually counterbalanced, whereby a uniform luminance can be obtained within one viewing zone. That is, the twenty five different types of sub-pixels P1 to P25 arranged in one viewing zone are overlapped with one another, whereby a luminance difference of the respective sub-pixels can be counterbalanced and thus, a uniformity of luminance within one viewing zone can be improved.

Since the stereopsis display device according to the third embodiment of the present invention can reduce a luminance difference LD within each viewing zone by changing a design of the black matrix 124 of the second substrate 120, it is favorable to apply the stereopsis display device according to the third embodiment to a glasses-free stereopsis display device. Also, various 3D display devices can be developed without incurring a substantial cost, as a simple design change can improve performance.

The slant angle of the lenticular lens has been described, assuming that a ratio of the horizontal width and the vertical width of the sub-pixel is 1:3. However, without limitation to the above example, the slant angle of the lenticular lens may be set to include a case where the ratio of the horizontal width and the vertical width of the sub-pixel is, for example, 1:2 or 1:4, in accordance with Equation 1.

Although twenty five different types sub-pixels arranged within one view matrix have been described, with their respective shapes different from one another, some of the twenty five different types may have the same shape.

Also, the delta modes of ½ delta, ⅓ delta, $^4\!/_9$ delta, $^9\!/_{22}$ delta and $^{25}\!/_{62}$ delta and the slant angle of the lenticular lens in each delta mode have been described as above. However, without limitation to the aforementioned examples, the stereopsis display device may be configured with various modes, in addition to the aforementioned delta modes of ½ delta, ⅓ delta, ⅘ delta, 9/22 delta and 25/62 delta.

Figure 15:
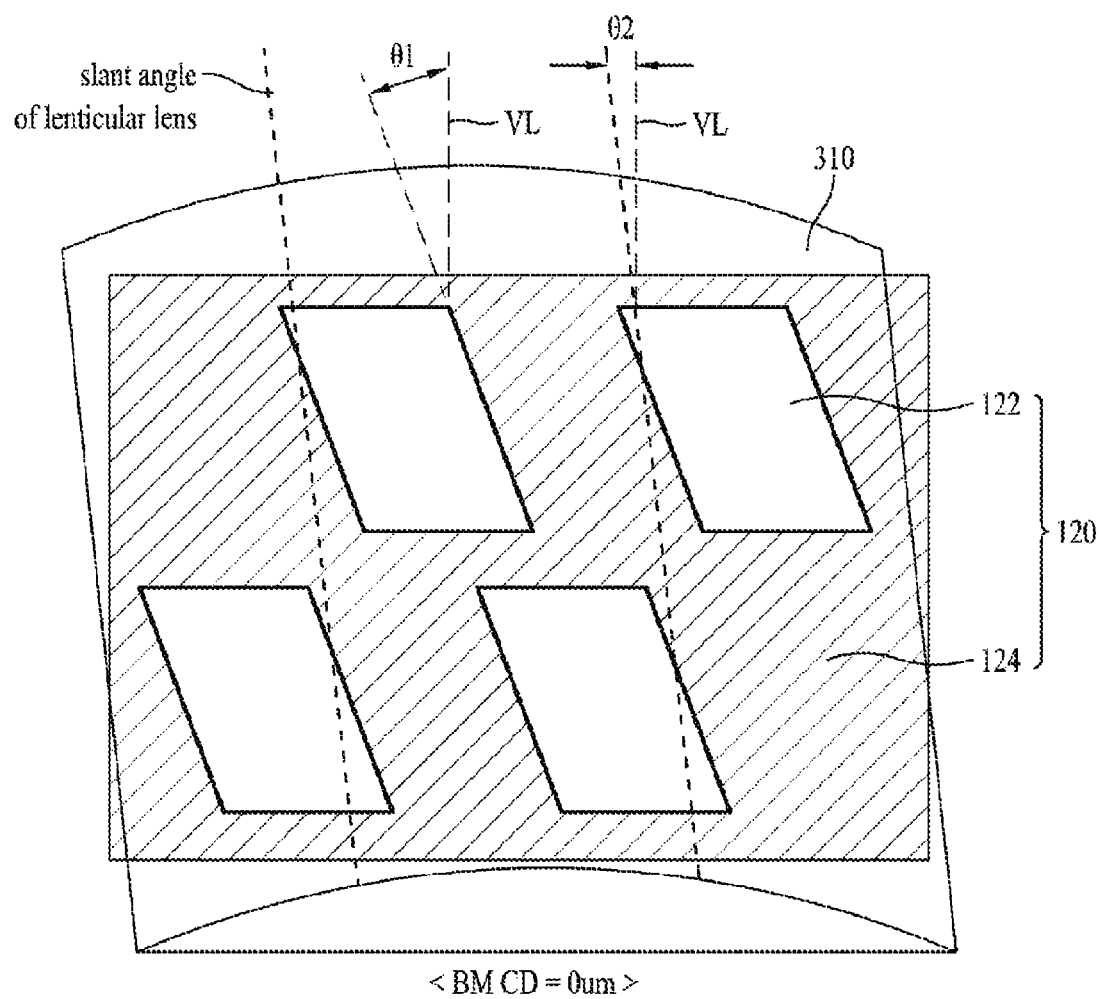
FIG. 15 is a diagram illustrating a second substrate (upper substrate) and a lenticular lens of a stereopsis display device according to an embodiment of the present invention, wherein a slant angle of an opening is formed differently from a slant angle of the lenticular lens based on that a critical dimension CD of a black matrix is '0'.

FIG. 15 is a diagram that illustrates a second substrate (upper substrate) and a lenticular lens of a stereopsis display device according to an embodiment of the present invention, wherein a slant angle of an opening is formed differently from a slant angle of the lenticular lens based on that a critical dimension CD of a black matrix is '0'.

Referring to FIG. 15, the second substrate 120 is a color filter array substrate that includes color filters, and includes a plurality of openings 122 overlapped on a plurality of sub-pixels while having a shape for reducing or minimizing a 3D crosstalk and a luminance difference (LD) per viewing zone.

Each opening 122 arranged on the second substrate 120 defines an opening area of each sub-pixel. Each opening 122 is slanted at a second slant angle of $\theta 2$ from a vertical line VL and overlapped with each sub-pixel region of the first substrate. Each opening 122 may be arranged to have the same area as that of the sub-pixel region of the first substrate 110, or may be arranged to have an area smaller than that of the sub-pixel region of the first substrate. However, without limitation to the above arrangement, each opening 122 may be arranged to have an area greater than that of the sub-pixel region.

An area, shape and slant angle of each opening 122 are defined by a black matrix 124 that serves as a light-shielding layer. That is, the area, shape and slant angle of the opening 122 of each sub-pixel are defined depending on a patterning type of the black matrix 124, regardless of an area, shape and slant angle of each sub-pixel region arranged on the first substrate 110 of the liquid crystal panel 100.

As a result, the plurality of sub-pixel regions arranged on the first substrate 110 may have the same shape as that of the plurality of openings 122, or may have a shape different from that of the plurality of openings 122. That is, the shape of the openings 122 arranged on the second substrate 120 is changed, regardless of the shape of the sub-pixel regions arranged on the first substrate 110, whereby a luminance difference between the viewing zones can be reduced. However, without limitation to the above example, the area, shape and slant angle of each sub-pixel arranged on the first substrate 110 may be set to correspond to the area, shape and slant angle of each opening 122.

In this case, the black matrix 124 is formed on the second substrate except each of the plurality of openings 122. A lenticular lens sheet 300 is arranged above the liquid crystal panel 100. The lenticular lens sheet 300 splits images displayed by the respective sub-pixels of the liquid crystal panel 100 into a plurality of viewing zones corresponding to a view map. As a result, a viewer is able to view a stereopsis image through the plurality of viewing zones.

The viewer feels a three-dimensionality in a given viewing zone through a binocular disparity between an image perceived by the left eye and an image perceived by the right eye. That is, if multi-views are supported, a viewing position (viewing zone) where each of a plurality of viewers can view 3D images is given to each of the viewers.

Each lenticular lens 310 is slanted at an angle different from the slope $\theta$ of the opening 122. That is, the plurality of lenticular lenses 310 and openings 122 are arranged in parallel on the liquid crystal panel 100 to have an oblique shape slanted at a given slope $\theta$. However, the slant angle of the lenticular lens 310 is different from that of the opening 122.

In more detail, the lenticular lens 310 is slanted at a first slant angle SA1 of $\theta 1$ based on a vertical line, and the opening 122 is arranged to be slanted at a second slant angle SA2 of $\theta 2$. In this case, the second slant angle $\theta 2$ of the opening 122 is set such that the opening 122 may be slanted at an angle of maximum ±3.5° with respect to the first slant angle $\theta 1$ of the lenticular lens 310. By doing so, if the first slant angle $\theta 1$ of the lenticular lens 310 is set to be different from the second slant angle $\theta 2$ of the opening 122, a partial sub-pixel region of another viewing zone adjacent to a corresponding viewing zone may be shown in the corresponding viewing zone in accordance with a view overlap mode. That is, an image of a first viewing zone may partially be shown in a second viewing zone, whereby a crosstalk of 3D image may partially be increased.

On the other hand, if the opening 122 is formed at the second slant angle $\theta 2$ of maximum ±3.5° with respect to the first slant angle $\theta 1$ of the lenticular lens 310, a luminance difference LD between the viewing zones can be reduced in spite of a critical dimension CD difference of the black matrix 124. As a result, the display quality of 3D images can be improved and the viewer is able to view 3D images of high quality with three-dimensionality in a glassless mode.

The second slant angle $\theta 2$ of the opening 122 is formed to be different from the first slant angle $\theta 1$ of the lenticular lens 310, whereby some openings arranged to adjoin one another in an up and down direction within a viewing zone are overlapped with one another. As a result, a luminance reduced in the sub-pixels arranged to adjoin in an up and down direction and a luminance increased therein are counterbalanced, whereby a luminance difference LD between the viewing zones can be reduced. At this time, although a vertical width of a portion where the openings of the viewing zones adjacent to each other are overlapped is smaller than an entire vertical width of the openings, a luminance difference LD between the viewing zones can be reduced as compared with a case where the slant angle of the lenticular lens is matched with that of the opening.

In this case, if the second slant angle of the opening 122 is increased as compared with the first slant angle $\theta 1$ of the lenticular lens, a luminance difference LD between the viewing zones can be reduced. However, a crosstalk CT between the viewing zones may increase in inverse proportion to the reduced luminance difference LD between the viewing zones. That is, the second slant angle $\theta 2$ of the opening 122 is preferably set in consideration of a trade-off relation between the crosstalk CT and the luminance difference LD. For example, the second slant angle $\theta 2$ of the opening 122 is slanted at an angle of maximum ±3.5° with respect to the first slant angle $\theta 1$ of the lenticular lens 310. In this way, if the second slant angle $\theta 2$ of the opening 122 is set such that the opening may be slanted at an angle of maximum ±3.5° with respect to the first slant angle $\theta 1$ of the lenticular lens 310, the viewer can view 3D images of high quality with three-dimensionality in a glassless mode.

An optimal value of the second slant angle $\theta 2$ of the opening 122 may vary depending on a size of the display panel. If the second slant angle $\theta 2$ of the opening 122 is set such that the opening may be slanted at an angle of maximum ±3.5° with respect to the first slant angle $\theta 1$ of the lenticular lens 310, a luminance difference LD, a crosstalk CT and a view width between the viewing zones can be maintained within acceptable ranges. Also, a luminance difference LD, a crosstalk CT and a view width within the same viewing zone can be maintained within acceptable ranges. This display panel can be applied to various applications, such as a mobile device, a monitor, a notebook computer, and a large-scaled TV.

If the second slant angle θ2 of the opening 122 is set such that the opening may be slanted at an angle of maximum ±3.5° with respect to the first slant angle θ1 of the lenticular lens 310, a luminance difference LD, a crosstalk CT and a view width can be maintained with acceptable ranges without any restriction in the size of the display panel. In this case, the view width indicates that a 3D crosstalk of a view domain, which occurs in a proper view distance by the lenticular lens, is less than 10%. The width of a view domain is typically set to 65 mm which is an average binocular interval of a person. However, the width of the view domain may be set to 32.5 mm like inter-view. That is, the width of the view domain may be set differently depending on the display device.

Figure 16:
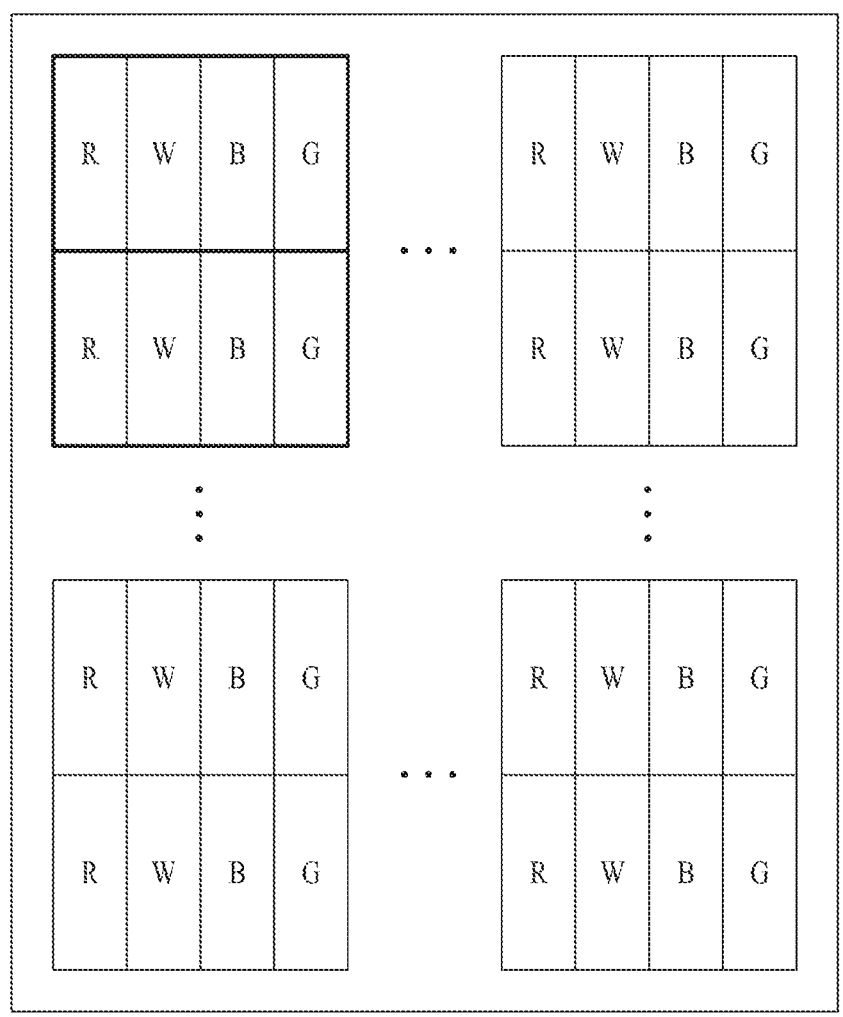
FIG. 16 is a diagram illustrating an arrangement structure of sub-pixels of a stereopsis display device according to the fourth embodiment of the present invention.

FIG. 16 is a diagram that illustrates an arrangement structure of sub-pixels of a stereopsis display device according to the fourth embodiment of the present invention.

Referring to FIG. 16, the stereoscopic image display device according to the fourth embodiment of the present invention has a screen size of 55 inches and a resolution of 8K, and one pixel is comprised of four colored R, G, B, and W sub-pixels. The R, W, B and G sub-pixels are repeatedly arranged on a first row based on a horizontal line, and the B, G, R and W sub-pixels are repeatedly arranged on a second row. The sub-pixels of the first and second rows are repeatedly arranged on an entire screen of the liquid crystal panel.

Figure 17:
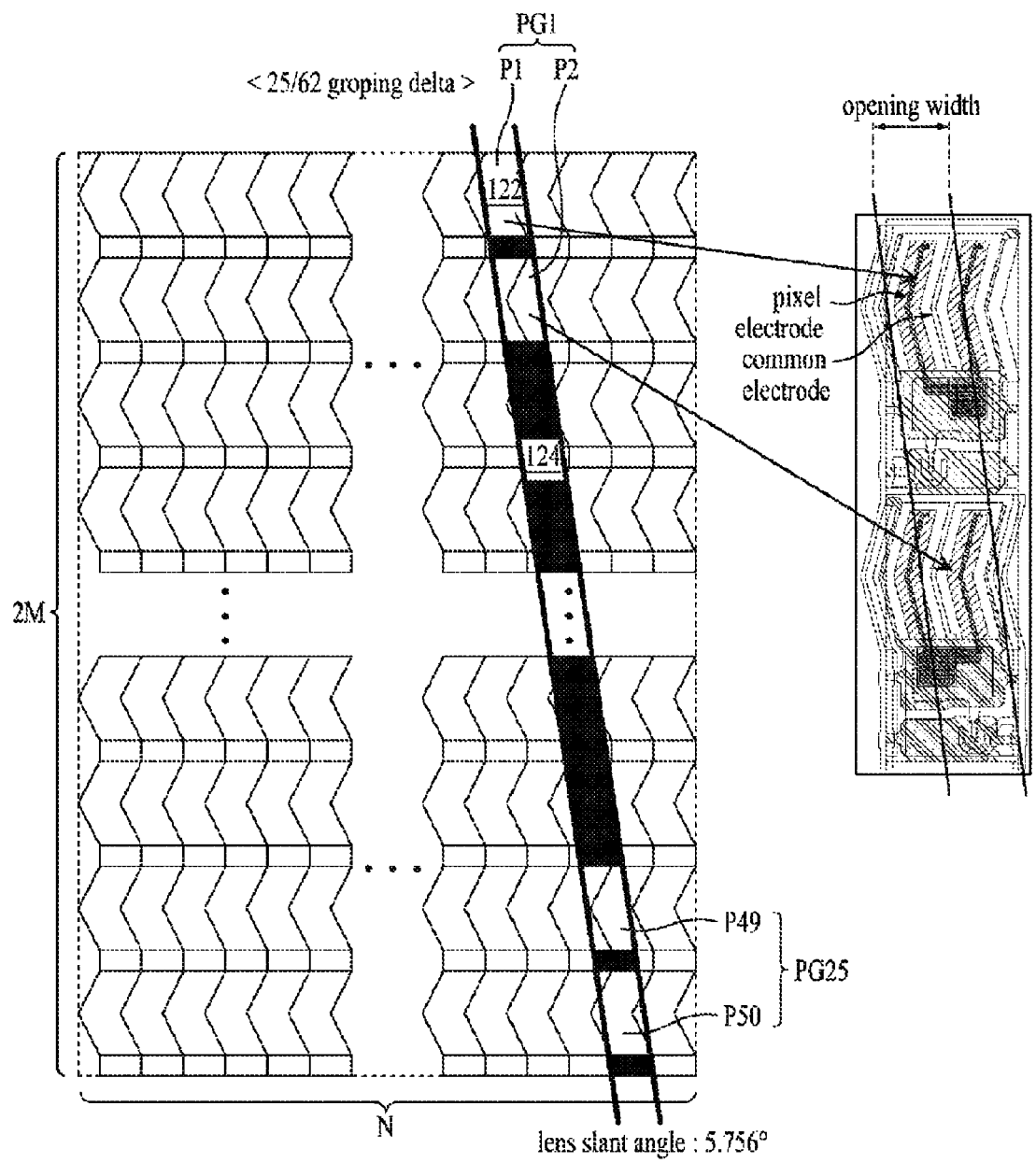
FIG. 17 illustrates an arrangement structure of pixels of a stereopsis display device according to the fourth embodiment of the present invention, wherein sub-pixels are overlapped with one another in a view matrix of a 25/62 grouping delta mode.
Figure 18:
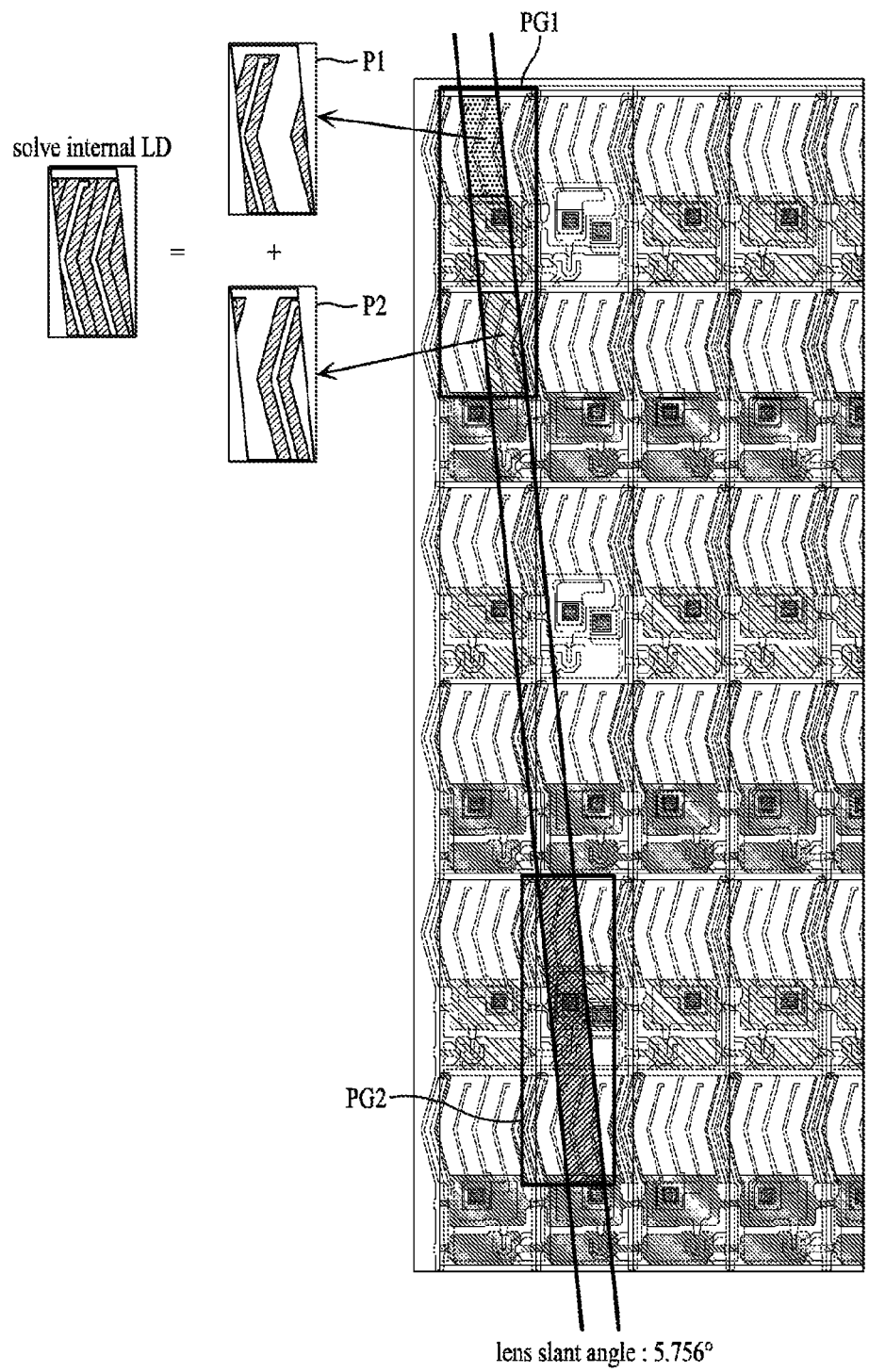
FIG. 18 illustrates that two different types of sub-pixels are arranged to adjoin each other in an up and down direction in a view matrix of a 25/62 grouping delta mode, wherein a pixel group is formed by the two sub-pixels arranged to adjoin each other in an up and down direction.

FIG. 17 illustrates an arrangement structure of pixels of a stereopsis display device according to the fourth embodiment of the present invention, wherein sub-pixels are overlapped with one another in a view matrix of a $^{25}/_{62}$ grouping delta mode. FIG. 18 illustrates that two different types of sub-pixels are arranged to adjoin each other in an up and down direction in a view matrix of a $^{25}/_{62}$ grouping delta mode illustrated in FIG. 17, wherein a pixel group is formed by two sub-pixels arranged to adjoin each other in an up and down direction to reduce a luminance difference within one viewing zone.

Referring to FIGS. 17 and 18, different types of sub-pixels are overlapped with one another within a view matrix of an N/2M grouping delta mode, for example, a $^{25}/_{62}$ grouping delta mode. In the stereopsis display device according to the fourth embodiment of the present invention, a ratio of a horizontal width and a vertical width of each sub-pixel is set to 1:3 by way of example.

One view matrix is comprised of 2M number of sub-pixels arranged in a first direction (e.g., vertical direction) and N number of sub-pixels arranged in a second direction (e.g. horizontal direction) (2M×N) to reduce a luminance difference within one viewing zone. In this case, 'M' is 62, and 'N' is 25. Therefore, 124 sub-pixels are arranged in a first direction (e.g., vertical direction) and 25 sub-pixels are arranged in a second direction (e.g., horizontal direction) so as to configure one view matrix.

In the one view matrix comprised of 2M×N sub-pixels, openings 122 of the sub-pixels are arranged such that a slant angle SA of a lenticular lens corresponds to 5.756°. As a result, different types of sub-pixels are arranged within one viewing zone.

In the $^{25}/_{62}$ grouping delta mode, 25 pixel groups PG1 to PG25 are arranged within a view matrix where 124 sub-pixels are arranged in a vertical direction and 25 sub-pixels are arranged in a horizontal direction. Each of the 25 pixel groups PG1 to PG25 is comprised of a plurality of sub-pixels (for example, two sub-pixels adjacent to each other in an up and down direction) adjacent to each other in an up and down direction. In this case, the two sub-pixels constituting one pixel group have their respective shapes different from each other. All of 50 sub-pixels constituting 25 sub-pixels PG1 to PG25 may have their respective shapes different from one another. However, without limitation to this example, some of the 50 sub-pixels constituting 25 pixel groups PG1 to PG25 may have their respective shapes different from one another.

The stereopsis display device according to the fourth embodiment of the present invention may arrange the sub-pixels having their respective shapes different from one another even without changing a layout of pixel electrodes and common electrodes of the sub-pixels arranged on the first substrate of the liquid crystal panel.

In more detail, if the sub-pixels are overlapped with one another within the view matrix of the $^{25}/_{62}$ delta mode, 50 of 124 sub-pixels arranged in a vertical direction form the openings 122 in accordance with the method illustrated in FIG. 8. The other 74 sub-pixels are covered by a black matrix 124.

Among the 124 sub-pixels arranged in a vertical direction, 50 sub-pixels opened (exposed) by the openings 122 and the 74 sub-pixels covered by the black matrix 124 are arranged repeatedly in a given pattern. As a result, the 50 sub-pixels opened (exposed) by the openings 122 and the 74 sub-pixels covered by the black matrix 124 are arranged uniformly on an entire screen of the liquid crystal panel. That is, within one view matrix, 25 sub-pixels are arranged in a horizontal direction, and 25 pixel groups are arranged in a vertical direction.

In this case, among the 124 sub-pixels arranged within one viewing zone according to the slant angle of the lenticular lens, the 50 sub-pixels opened by the openings 122 may be selected by the following conditions.

First of all, 50 sub-pixels, of which pixel electrodes and common electrodes have great opening areas and color filters CF have great opening areas, are selected from the 124 sub-pixels. At this time, the 50 sub-pixels opened by the openings 122 are not arranged such that they adjoin one another or are spaced apart from another. One pixel group is set in a unit of two sub-pixels adjacent to each other in an up and down direction, and a total of 25 pixel groups are arranged uniformly within one view matrix.

Subsequently, the openings 122 are formed such that the 50 sub-pixels selected from the 124 sub-pixels are opened, and the other 74 sub-pixels which are not selected are covered by the black matrix 124.

Figure 19A:
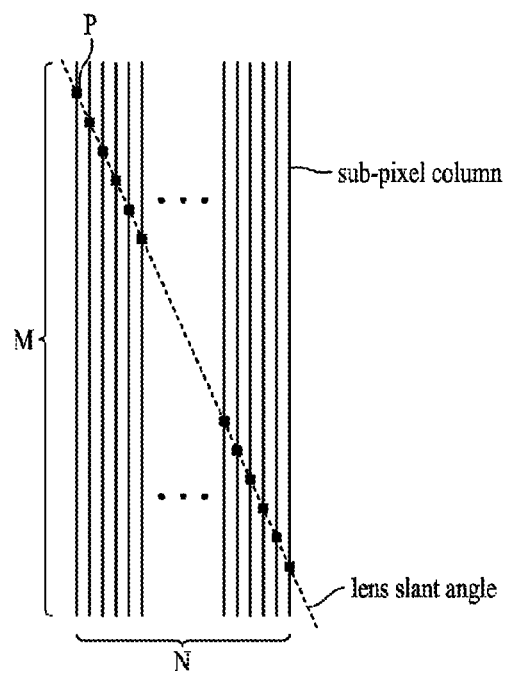
FIG. 19A illustrates that sub-pixels opened by openings are arranged within a view matrix of an N/M delta mode, wherein each sub-pixel row and each sub-pixel opened by the openings are arranged within one view matrix to correspond to each other on a one-to-one basis.

FIG. 19A illustrates that sub-pixels opened by openings are arranged within a view matrix of an N/M delta mode, wherein each sub-pixel row and each sub-pixel opened by the openings are arranged within one view matrix to correspond to each other on a one-to-one basis.

Referring to FIG. 19A, within a view matrix of a $^{25}/_{62}$(N/M) delta mode, 25 sub-pixel columns are arranged and 62 sub-pixel rows are arranged. A virtual diagonal line according to the slant angle of the lenticular lens and 25 points where 25 sub-pixels are overlapped occurs. That is, 25 intersection points of the sub-pixels and a diagonal line according to the slant angle of the lenticular lens occurs. In FIG. 19A, the 25 intersection points are marked.

For an opening ratio of each of the sub-pixels arranged in one view matrix in accordance with the slant angle of the lenticular lens, the sub-pixels P corresponding to the 25 intersection points have greater opening ratios. Therefore, the 25 sub-pixels having the greater opening ratios are selected and then arranged to correspond to the 25 sub-pixel columns on a one-to-one basis. At this time, the openings are arranged in the 25 sub-pixels P, and the other sub-pixels are covered by the black matrix 124.

Figure 19B:
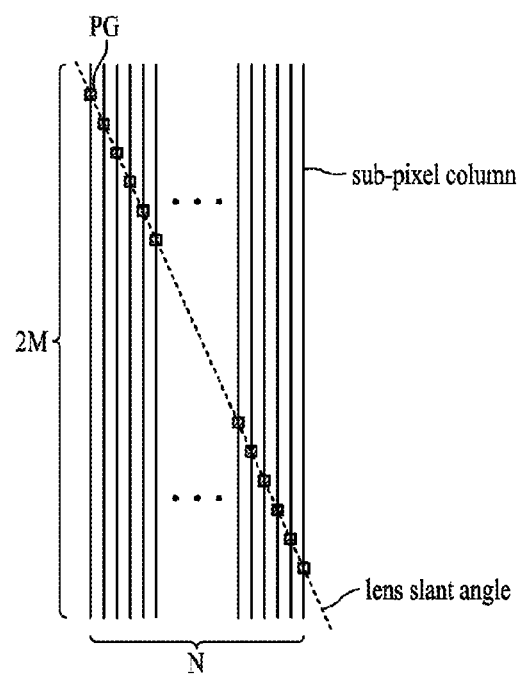
FIG. 19B illustrates that sub-pixels opened by openings are arranged within a view matrix of an N/2M delta mode, wherein each sub-pixel and each pixel group opened by the openings are arranged within one view matrix to correspond to each other on a one-to-one basis.

FIG. 19B illustrates that sub-pixels opened by openings are arranged within a view matrix of an N/2M delta mode, wherein each sub-pixel row and each pixel group opened by the opening are arranged within one view matrix to correspond to each other on a one-to-one basis.

Referring to FIG. 19B, within a view matrix of a $^{25}/_{62}$(N/2M) delta grouping mode, 25 sub-pixel columns are arranged and 124 sub-pixel rows are arranged. A virtual diagonal line according to the slant angle of the lenticular lens and 25 points where 25 sub-pixels are overlapped occurs. That is, 25 intersection points of the sub-pixels and a diagonal line according to the slant angle of the lenticular lens occurs. In the view matrix of the $^{25}/_{62}$ grouping delta mode, each of the 25 intersection points becomes one pixel group PG. In FIG. 19b, the 25 intersection points are marked.

For an opening ratio of each of the sub-pixels that arranged in one view matrix in accordance with the slant angle of the lenticular lens, 50 sub-pixels corresponding to the 25 intersection points have greater opening ratios. Therefore, since one pixel group includes 2 sub-pixels adjacent to each other in an up and down direction, the 50 sub-pixels are arranged at the 25 intersection points. Therefore, the 50 sub-pixels having the greater opening ratios are selected and then 25 pixel groups having the greater opening ratios are arranged to correspond to the 25 sub-pixel columns on a one-to-one basis. At this time, the openings are arranged in the 50 sub-pixels included in the 25 pixel groups, and the other sub-pixels are covered by the black matrix 124.

Referring back to FIGS. 17 and 18, openings 122 of two sub-pixels constituting one pixel group have the same shape and area as each other. Since the openings are arranged to be slanted at a given angle, each pixel electrode and each common electrode of the two sub-pixels constituting one pixel group are exposed in their respective shapes different from each other by the openings 122. As a result, the two sub-pixels constituting one pixel group have their respective shapes different from each other. That is, the pixel electrodes and the common electrodes arranged in the plurality of sub-pixels included in one pixel group have the same layout but their exposed portions are different from one another due to the openings 122.

Also, openings 122 of sub-pixels (a total of 50 sub-pixels) constituting each of the first to twenty-fifth pixel groups PG1 to PG25 have the same shape and area as one another. Since the openings 122 are arranged to be slanted at a given angle, pixel electrodes and common electrodes of the 50 sub-pixels constituting the first to twenty-fifth pixel groups PG1 to PG25 are exposed in their respective shapes different from one another due to the openings 122. As a result, the 50 sub-pixels constituting the first to twenty-fifth pixel groups PG1 to PG25 have their respective shapes different from one another. That is, different types of 50 sub-pixels P1 to P50 are arranged within one view matrix and overlapped in pairs in a unit of two sub-pixels. At this time, the two sub-pixels constituting one pixel group are arranged to adjoin each other in an up and down direction.

The two sub-pixels arranged within one viewing zone to adjoin each other in an up and down direction have their respective shapes different from each other to compensate for luminance non-uniformity. That is, the two sub-pixels arranged within one viewing zone to adjoin each other in an up and down direction to constitute one pixel group are complementary sub-pixels that counterbalance luminance non-uniformity.

As described above, as one pixel group is comprised of two sub-pixels having their respective shapes different from each other and the two sub-pixels are overlapped with each other, low luminance portions and high luminance portions can be mutually counterbalanced. Moreover, as twenty five different pixel groups are arranged within one view matrix, low luminance portions and high luminance portions can be mutually counterbalanced in each of the twenty five pixel groups, whereby a uniform luminance can be obtained within one viewing zone. That is, among the 124 sub-pixels arranged in the same viewing zone, 50 sub-pixels P1 to P50 having their respective shapes different from one another are opened by the openings 122, and are overlapped with one another. The other 74 sub-pixels are covered by the black matrix 124.

If the stereoscopic image display device according to the fourth embodiment of the present invention has a screen size of 55 inches and a resolution of 8K, one sub-pixel may have a size of 78.75 um (horizontal)×157.5 um (vertical). At this time, if the view matrix of the $^{25}/_{62}$ grouping delta mode is applied, the horizontal width of the opening 122 of each sub-pixel may be 31.754 um (157.5 um×$^{25}/_{62}$).

Alternatively, a patterning type of the black matrix 124 may vary to move a position, in which the openings 122 of the first to fiftieth sub-pixels P1 to P50 are formed, to a left and right direction, whereby the openings 122 of the respective sub-pixels may be arranged differently. By doing so, if the positions where the openings 122 of the sub-pixels are arranged are different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the pixel electrodes and the common electrodes of the respective sub-pixels opened (exposed) by the openings 122 have their respective shapes different from one another. As a result, 50 different types of sub-pixels P1 to P50 may be arranged within one view matrix.

As described above, if 50 different types of sub-pixels P1 to P50 are overlapped with one another, low luminance portions and high luminance portions of the 50 sub-pixels P1 to P50 can be mutually counterbalanced, whereby a uniform luminance is obtained within one viewing zone. That is, 25 pixel groups PG1 to PG25 arranged in one viewing zone are overlapped with one another, whereby a luminance difference of the respective pixel groups PG1 to PG25 can be counterbalanced and thus, a uniformity of luminance within one viewing zone can be improved.

FIGS. 17 and 18 illustrate some pixels in one view matrix. As illustrated, the view matrix of the $^{25}/_{62}$ grouping delta mode may be arranged repeatedly on the liquid crystal panel.

If view matrixes of the $^{25}/_{62}$ grouping delta mode are applied to a stereoscopic image display device having a screen size of 55 inches and a resolution of 8K, the slant angle SA of the lenticular lens may be set in accordance with the following Equation 2.

$$SA = \tan^{-1}(N/4M) [N, M:\text{natural number}, N<M] \quad \text{[Equation 2]}$$

In Equation 2, 'SA' refers to a slant angle of the lenticular lens, 'M' refers to a number of sub-pixels arranged within one view matrix in a first direction (e.g., vertical direction), and 'N' refers to a number of sub-pixels (or a number of pixel groups arranged in a first direction) arranged within one view matrix in a second direction (e.g., horizontal direction).

The view matrixes of the 25/62 grouping delta mode may be configured in a stereopsis display device having a screen size of 55 inches and a resolution of 8K, and the slant angle SA of the lenticular lens may be set to 5.756°.

If the slant angle SA of the lenticular lens is set to 5.756° and 25 pixel groups (a total of 50 sub-pixels), each of which includes two sub-pixels adjacent to each other in an up and down direction, having their respective shapes different from each other, are overlapped with one another. A pixel electrode and a common electrode of each sub-pixel, which may have a finger pattern, can be counterbalanced. Also, a disclination at an edge portion of a domain in each sub-pixel may be counterbalanced, and a luminance difference of the respective sub-pixels due to a non-uniformity of liquid crystal (LC) driving within the respective sub-pixels may be counterbalanced. As a result, a luminance uniformity within one viewing zone can be improved.

TABLE 1

| Overlap condition of pixels | | Gray | White | Gray_avg. | White_avg. |
|---|---|---|---|---|---|
| N | M | LD | LD | LD | LD |
| Comparison example | 1 | 3 | 75.3% | 50.5% | 83.6% | 50.2% |
| Fourth embodiment of the present invention | 25 | 62 | 2.70% | 0.94% | 2.79% | 0.95% |
| Fifth embodiment of the present invention | 25 | 64 | 2.72% | 2.08% | 2.80% | 2.08% |
| Sixth embodiment of the present invention | 33 | 70 | 3.12% | 3.86% | 3.16% | 3.79% |

In Table 1, the comparison example is configured with a case where sub-pixels are overlapped in a view matrix of a ⅓ delta mode, and the luminance uniformity of the comparison example is compared with that of the fourth embodiment of the present invention to which a view matrix of a 25/62 grouping delta mode is applied.

As disclosed in Table 1, a low luminance portion and a high luminance portion of each of 25 pixel groups are mutually counterbalanced, whereby a gray luminance difference, a white luminance difference, a gray average luminance difference and a white average luminance difference can be reduced. That is, a uniformity of gray luminance, a uniformity of white luminance, a uniformity of gray average luminance and a uniformity of white average luminance can be improved.

Figure 20A:
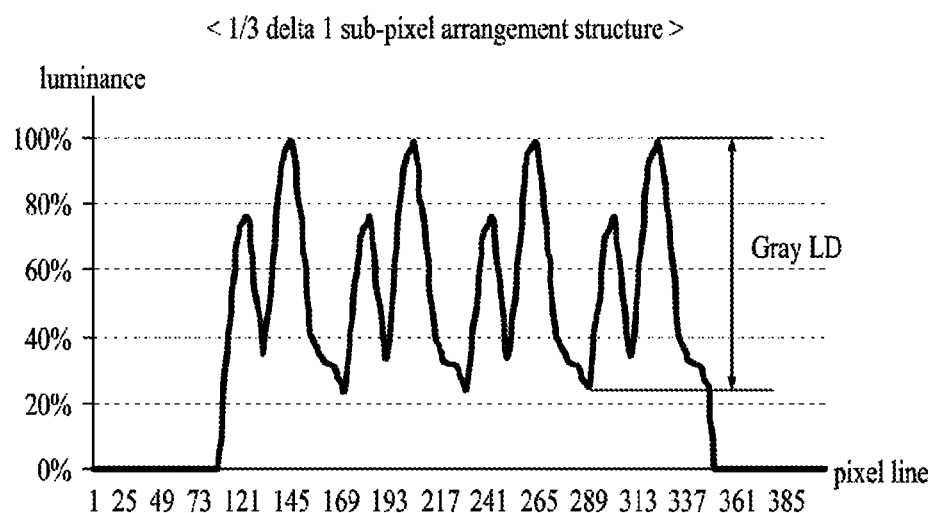
FIG. 20A shows a gray luminance difference within one viewing zone when sub-pixels are overlapped with one another in a view matrix of a ⅓ delta mode.
Figure 20B:
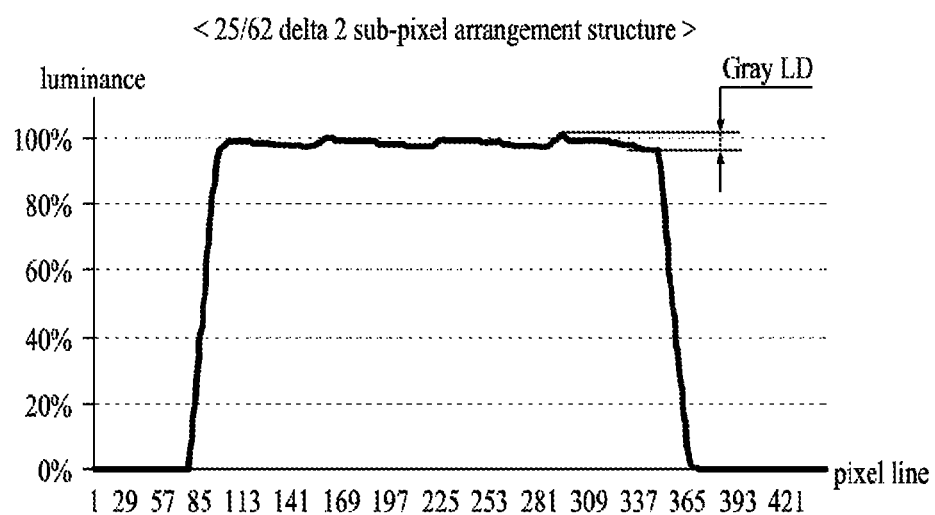
FIG. 20B shows a gray luminance difference within one viewing zone when respective pixel groups are formed by two sub-pixels arranged in a view matrix of a 25/62 grouping delta mode to adjoin each other in an up and down direction and overlapped with one another.

FIG. 20A is a diagram that shows a gray luminance difference within one viewing zone when sub-pixels are overlapped with one another in a view matrix of a ⅓ delta mode. FIG. 20B is a diagram that shows a gray luminance difference within one viewing zone when respective pixel groups are formed by two sub-pixels arranged in a view matrix of a 25/62 grouping delta mode to adjoin each other in an up and down direction and overlapped with one another.

Referring to FIGS. 20A and 20B together with Table 1, if the view matrix of the ⅓ delta mode is applied, a gray luminance difference is 75.3%. On the other hand, if the view matrix of the 25/62 grouping delta mode according to the fourth embodiment of the present invention is applied, a gray luminance difference is reduced to 2.70%.

Also, if the view matrix of the ⅓ delta mode is applied, a white luminance difference is 50.5%, whereas if the view matrix of the 25/62 grouping delta mode according to the fourth embodiment of the present invention is applied, a white luminance difference is reduced to 0.94%.

Also, if the view matrix of the ⅓ delta mode is applied, a gray average luminance difference is 83.6%, whereas if the view matrix of the 25/62 grouping delta mode according to the fourth embodiment of the present invention is applied, a gray average luminance difference is reduced to 2.79%.

Also, if the view matrix of the ⅓ delta mode is applied, a white average luminance difference is 50.2%, whereas if the view matrix of the 25/62 grouping delta mode according to the fourth embodiment of the present invention is applied, a white average luminance difference is reduced to 0.95%.

As shown Table 1, the gray luminance difference is greater than the white luminance difference. The stereopsis display device according to the fourth embodiment of the present invention can reduce the gray luminance difference by using a view matrix of a 25/62 grouping delta mode and setting the slant angle SA of the lenticular lens to, for example, 5.756°.

The slant angle of the opening 122 has been described to be the same as the slant angle SA of the lenticular lens. However, without limitation to this example, the slant angle of the opening 122 and the slant angle of the lenticular lens may be set to be different from each other. At this time, the second slant angle of the opening 122 may be slanted at an angle of maximum ±3.5° with respect to the first slant angle of the lenticular lens.

If a plurality of pixel groups are overlapped with one another within the view matrix of the 25/62 grouping delta mode, two sub-pixels included in each of the plurality of pixel groups, having their respective shapes different from each other are overlapped with each other, and the slant angle SA of the lenticular lens is set to 5.756°, a luminance difference LD within one viewing zone and a crosstalk CT can be maintained within acceptable ranges. This display panel can be applied to various applications, such as a mobile device, a monitor, a notebook computer, and a large-scaled TV.

The stereopsis display device according to the fourth embodiment of the present invention can reduce a luminance difference LD within one viewing zone by setting the slant angle of the lenticular lens in accordance with Equation 2 and changing a design of the black matrix 124 of the second substrate 120. As a result, if the stereopsis display device according to the fourth embodiment of the present invention is applied to a glasses-free stereopsis display device, 3D images of high quality can be provided to the viewer. Also, various 3D display devices can be developed without incurring a substantial cost, as a simple design change can improve performance.

The slant angle of the lenticular lens has been described, assuming that a ratio of the horizontal width and the vertical width of the sub-pixel is 1:3 by way of example. However, without limitation to the above example, the slant angle of the lenticular lens may be set to include a case where the ratio of the horizontal width and the vertical width of the sub-pixel is, for example, 1:2 or 1:4, by using Equation 2.

Although the 50 sub-pixels arranged within one view matrix have been described, assuming that the 50 sub-pixels have their respective shapes different from one another, some of the 50 sub-pixels may have the same shape.

Referring back to Table 1, the stereopsis display device may be configured by using other types of view matrixes, in addition to the view matrix of the 25/62 grouping delta mode.

As the fifth embodiment of the present invention, a view matrix of a 25/64 grouping delta mode may be applied. If the view matrix of the 25/64 grouping delta mode is applied to a stereopsis display device according to the fifth embodiment of the present invention, 128 sub-pixels are arranged in a first direction (e.g., vertical direction) and 25 sub-pixels are arranged in a second direction (e.g., horizontal direction), whereby one view matrix is configured. At this time, one pixel group is configured by two sub-pixels arranged to adjoin each other in an up and down direction, having their respective shapes different from each other, and a total of 25 pixel groups may be arranged uniformly within the view matrix. Among the 128 sub-pixels arranged in the view matrix of the 25/64 grouping delta mode, 50 sub-pixels are opened by the opening, and the other 78 sub-pixels are covered by the black matrix 124.

Also, as the sixth embodiment of the present invention, a view matrix of a 33/70 grouping delta mode may be applied. If the view matrix of the 33/70 grouping delta mode is applied to a stereopsis display device according to the sixth embodiment of the present invention, 140 sub-pixels are arranged in a first direction (e.g., vertical direction) and 33 sub-pixels are arranged in a second direction (e.g., horizontal direction), whereby one view matrix is configured. At this time, one pixel group is configured by two sub-pixels arranged to adjoin each other in an up and down direction, having their respective shapes different from each other, and a total of 33 pixel groups may be arranged uniformly within the view matrix. Among the 140 sub-pixels arranged in the view matrix of the 33/70 grouping delta mode, 66 sub-pixels are opened by the opening, and the other 74 sub-pixels are covered by the black matrix 124.

In the fifth and sixth embodiments of the present invention, the slant angle of the lenticular lens may be set to 5.756°.

In Table 1, the comparison example is configured with a case where sub-pixels are overlapped in a view matrix of a ⅓ delta mode, and the luminance uniformity of the comparison example is compared with that of the fifth embodiment of the present invention to which a view matrix of a 25/64 grouping delta mode is applied. Also, the luminance uniformity of the comparison example is compared with that of the sixth embodiment of the present invention to which a view matrix of a 33/70 grouping delta mode is applied.

First of all, in the fifth embodiment of the present invention to which the view matrix of the 25/64 grouping delta mode is applied, a gray luminance difference is reduced to 2.72%, a white luminance difference is reduced to 2.08%, a gray average luminance difference is reduced to 2.80%, and a white average luminance difference is reduced to 2.08%.

Subsequently, in the sixth embodiment of the present invention to which the view matrix of the 33/70 grouping delta mode is applied, a gray luminance difference is reduced to 3.12%, a white luminance difference is reduced to 3.86%, a gray average luminance difference is reduced to 3.16%, and a white average luminance difference is reduced to 3.79%.

That is, in the fourth to sixth embodiments described as above, each of the gray luminance difference, the white luminance different, the gray average luminance difference and the white average luminance difference is less than 4%. In this case, a luminance non-uniformity within one viewing zone is improved.

Figure 21:
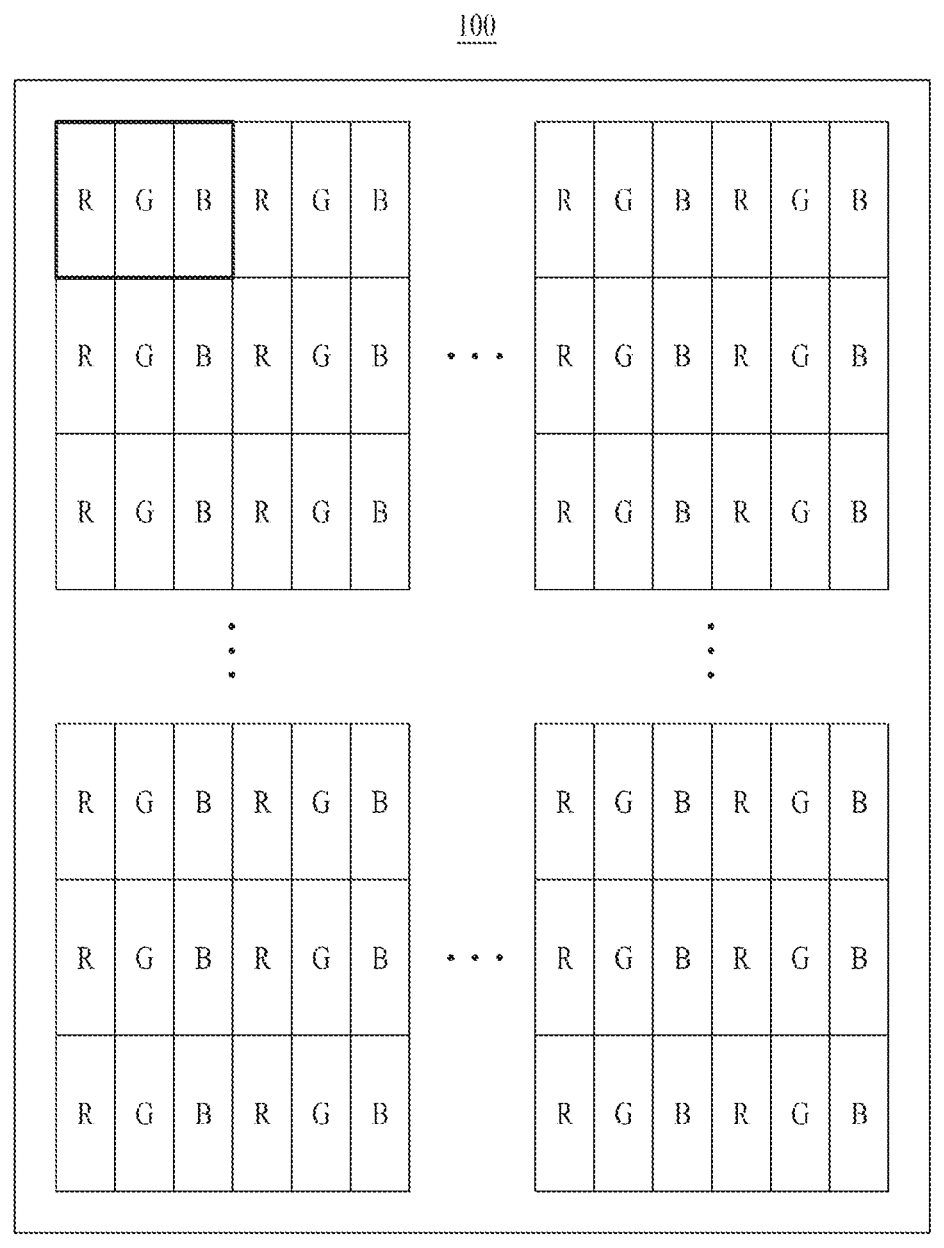

FIG. 21 is a diagram that illustrates an arrangement structure of sub-pixels of a stereopsis display device according to the seventh embodiment of the present invention.

Referring to FIG. 21, the stereopsis display device according to the seventh embodiment of the present invention has a screen size of 55 inches and a resolution of 4K, and one pixel is comprised of three colored R, G and B sub-pixels. The R, B and G sub-pixels are repeatedly arranged based on a horizontal line and a vertical line.

Figure 22:
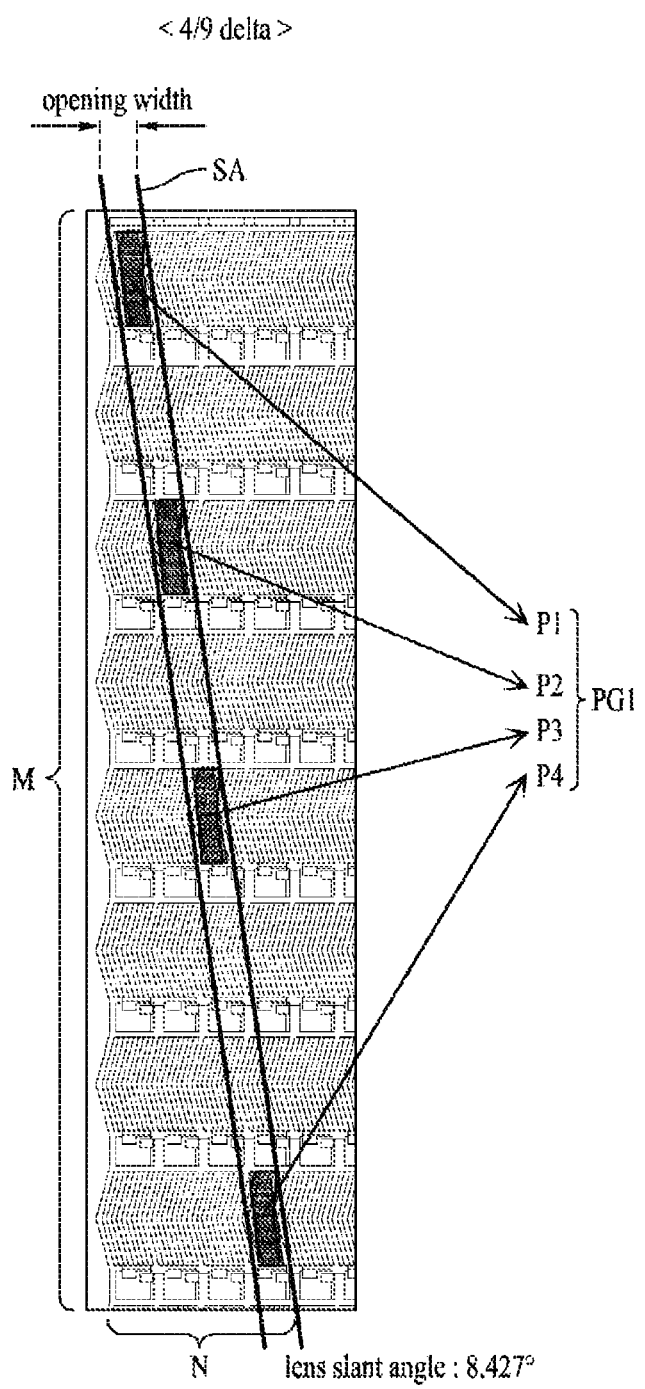
FIG. 22 illustrates an arrangement structure of pixels of a stereopsis display device according to the seventh embodiment of the present invention, wherein a pixel group is formed in a view matrix of a 4/9 delta mode by four different types of sub-pixels.

FIG. 22 illustrates an arrangement structure of pixels of a stereopsis display device according to the seventh embodiment of the present invention, wherein a pixel group is formed in a view matrix of a 4/9 delta mode with four different types of sub-pixels to reduce a luminance difference within one viewing zone. In FIG. 22, a ratio of a horizontal width and a vertical width of each sub-pixel is set to 1:3 by way of example.

Referring to FIG. 22, each of a plurality of openings 122 overlapped on a plurality of sub-pixels has a shape for reducing or minimizing a 3D crosstalk and a luminance difference LD within a viewing zone.

Each opening 122 defines an opening area of the sub-pixel. Each opening 122 is slanted at a given angle of θ from a vertical line and overlapped with each sub-pixel region of the first substrate. Each opening 122 may be arranged to have the same area as that of the sub-pixel region of the first substrate, or may be arranged to have an area smaller than that of the sub-pixel region of the first substrate. However, without limitation to the above arrangement, each opening 122 may be arranged to have an area greater than that of the sub-pixel region of the first substrate.

An area, shape and slant angle of each opening 122 are defined by a black matrix 124 that serves as a light-shielding layer. That is, the area, shape and slant angle of the opening 122 of each sub-pixel are defined depending on a patterning type of the black matrix 124, regardless of an area, shape and slant angle of each sub-pixel region arranged on the first substrate 110 of the liquid crystal panel 100.

As a result, each of the plurality of sub-pixel regions arranged on the first substrate 110 may have the same shape as that of each of the plurality of openings 122. Meanwhile, each of the plurality of sub-pixel regions arranged on the first substrate may have a shape different from that of each of the plurality of openings 122. That is, in the seventh embodiment of the present invention, the shape of the opening 122 is changed using the black matrix 124 arranged on the second substrate 120, regardless of the shape of the sub-pixel regions arranged on the first substrate 110, whereby a luminance difference within a viewing zone can be reduced.

However, without limitation to the above example, the area, shape and slant angle of each sub-pixel region arranged on the first substrate 110 may be set to correspond to the area, shape and slant angle of each opening 122.

A length direction of each lenticular lens 310 is slanted at either the same angle as or an angle different from the slope θ of the opening 122. That is, the plurality of lenticular lenses 310 and openings 122 may be arranged in parallel on the liquid crystal panel 100 to have an oblique shape slanted at a given slope θ. At this time, the slant angle of the lenticular lens 310 may be the same as or different from that of the opening 122.

The lenticular lens 310 may be arranged to be slanted at a first slant angle based on a vertical line, and the opening 122 may be slanted at the first slant angle by way of example.

Alternatively, the lenticular lens 310 may be slanted at a first slant angle based on a vertical line, and the opening 122 may be arranged to be slanted at a second slant angle. In this case, the second slant angle of the opening 122 may be set such that the opening may be slanted with a range of maximum ±3.5° with respect to the first slant angle of the lenticular lens 310.

One view matrix is comprised of M number of sub-pixels arranged in a first direction (e.g., vertical direction) and N number of sub-pixels arranged in a second direction (e.g., horizontal direction) (M×N) to reduce a luminance difference within one viewing zone. The openings 112 of the sub-pixels are arranged differently within one view matrix comprised of M×N number of sub-pixels, whereby the sub-pixels having their respective shapes different from one another are arranged within one viewing zone. In this case, the slant angle SA of the lenticular lens may be set to 8.427°.

In more detail, in FIG. 22, sub-pixels are arranged within a view matrix of an N/M grouping delta mode, for example, a 4/9 grouping delta mode. In the 4/9 grouping delta mode, four different types of sub-pixels P1, P2, P3 and P4 are arranged within a matrix where nine sub-pixels are arranged in a vertical direction and four sub-pixels are arranged in a horizontal direction. One pixel group PG1 is comprised of four different types of sub-pixels P1, P2, P3 and P4. All of the four sub-pixels constituting one pixel group may have their respective shapes different from one another. However, without limitation to this example, some of the four sub-pixels may have their respective shapes different from one another.

The stereopsis display device according to the seventh embodiment of the present invention may arrange sub-pixels having their respective shapes different from one another even without changing a layout of pixel electrodes and common electrodes of the sub-pixels arranged on the first substrate of the liquid crystal panel.

In more detail, if the sub-pixels are overlapped with one another within the view matrix of the 4/9 grouping delta mode, four of nine sub-pixels arranged in a vertical direction form the openings 122 in accordance with the method illustrated in FIG. 8. The other five sub-pixels are covered by the black matrix 124.

Among the nine sub-pixels arranged in a vertical direction, the four sub-pixels opened (exposed) by the openings 122 and the five sub-pixels covered by the black matrix 124 are arranged repeatedly in a given pattern. As a result, the four sub-pixels opened (exposed) by the openings 122 and the five sub-pixels covered by the black matrix 124 are arranged uniformly on an entire screen of the liquid crystal panel.

In this case, among the sub-pixels arranged within one viewing zone according to the slant angle of the lenticular lens, the four sub-pixels opened by the openings 122 may be selected by the following conditions.

First of all, four sub-pixels, of which pixel electrodes and common electrodes have great opening areas and color filters CF have great opening areas, are selected from the nine sub-pixels.

Subsequently, the openings 122 are formed such that the four sub-pixels selected from the nine sub-pixels are opened, and the other sub-pixels which are not selected are covered by the black matrix.

The openings 122 of four sub-pixels constituting one pixel group have the same shape and area as one another. Since the openings 122 are arranged to be slanted at a given angle, pixel electrodes and common electrodes of the four sub-pixels constituting one pixel group are exposed in their respective shapes different from one another due to the openings 122. Therefore, the four sub-pixels constituting one pixel group have their respective shapes different from one another. That is, different types of four sub-pixels P1 to P4 are arranged within one view matrix and overlapped in pairs. The four sub-pixels arranged within one viewing zone have their respective shapes different from one another to compensate for luminance non-uniformity. That is, the four sub-pixels constituting one pixel group are complementary sub-pixels that counterbalance luminance non-uniformity.

As described above, as one pixel group is comprised of four sub-pixels having their respective shapes different from one another and the four sub-pixels are overlapped with one another, low luminance portions and high luminance portions can be mutually counterbalanced. As a result, a uniform luminance can be obtained within one viewing zone.

If a stereoscopic image display device according to the seventh embodiment of the present invention has a screen size of 55 inches and a resolution of 4K, one sub-pixel may have a size of 105 um (horizontal)×315 um (vertical). At this time, if the view matrix of the 4/9 grouping delta mode is applied, the horizontal width of the opening 122 of each sub-pixel may be 46.667 um (105 um×4/9).

Alternatively, a patterning type of the black matrix 124 may vary to move a position, in which the openings 122 of the first to fourth sub-pixels P1 to P4 are formed, to a left and right direction, whereby the openings 122 of the respective sub-pixels may be arranged differently. By dong so, if the positions where the openings 122 of the sub-pixels are arranged are different from one another, the pixel electrodes and the common electrodes of the first substrate corresponding to the openings 122 of the respective sub-pixels are arranged differently. That is, even though the pixel electrodes and the common electrodes of the sub-pixels arranged on the first substrate have the same layout, the pixel electrodes and the common electrodes of the respective sub-pixels opened (exposed) by the openings 122 have their respective shapes different from one another. As a result, four different types of sub-pixels P1 to P4 may be arranged within one view matrix.

As described above, if four different types of sub-pixels P1 to P4 are overlapped with one another, low luminance portions and high luminance portions of the for sub-pixels P1 to P4 are mutually counterbalanced, whereby a uniform luminance can be obtained within one viewing zone.

FIG. 22 illustrates some pixels in one view matrix. As illustrated, the view matrix of the 4/9 grouping delta mode can be arranged repeatedly on the liquid crystal panel.

Although not shown, a view matrix of a 9/22 grouping delta mode as well as a view matrix of a 4/9 grouping delta mode may be applied to a stereopsis display device. If the view matrix of the 9/22 grouping delta mode is applied to a stereopsis display device, nine different types of sub-pixels of the sub-pixels arranged in one view matrix are arranged in one viewing zone. The nine different types of sub-pixels may be grouped to form one pixel group. In this case, if the slant angle SA of the lenticular lens is set to 5.756° and the nine sub-pixels having their respective shapes different from one another are overlapped with one another, low luminance portions and high luminance portions of the respective sub-pixels can be mutually counterbalanced, whereby a uniform luminance is obtained within one viewing zone.

As a result, finger patterns of a pixel electrode and a common electrode of each sub-pixel can be counterbalanced. Also, a disclination at an edge portion of a domain in each sub-pixel may be counterbalanced, and a luminance difference of the respective sub-pixels due to non-uniformity of liquid crystal (LC) driving within the respective sub-pixels may also be counterbalanced. As a result, a luminance uniformity within one viewing zone can be improved. This display panel can be applied to various applications, such as a mobile device, a monitor, a notebook computer, and a large-scaled TV.

It will be apparent to those skilled in the art that various modifications and variation can be made in the present invention without departing from the concepts and scope of the invention. Thus, it is intended that the present invention cover the modifications and variations of this invention provided they come within the scope of the appended claims and their equivalents.

What is claimed is:

1. A stereopsis display device comprising:
a plurality of sub-pixels including openings;
a black matrix defining the openings; and
a plurality of lenticular lenses slanted at a slant angle,
wherein one view matrix includes a unit of M number of sub-pixels arranged in a first direction and N number of sub-pixels arranged in a second direction, wherein M and N are a positive integer, that is divided into sub-pixels opened by the openings and sub-pixels covered by the black matrix, and
wherein a number of the sub-pixels of the unit opened by the openings among the unit of M number of sub-pixels arranged in the first direction is N.

2. The stereopsis display device of claim 1, wherein the openings within respective sub-pixel regions in the opened N number of sub-pixels have their respective positions different from one another.

3. The stereopsis display device of claim 1, wherein the openings of the opened N number of respective sub-pixels have their respective shapes different from one another.

4. The stereopsis display device of claim 1, wherein the openings of the opened N number of respective sub-pixels have the same areas as one another.

5. The stereopsis display device of claim 1, wherein nine sub-pixels are arranged in the first direction and four sub-pixels are arranged in the second direction to configure the one view matrix, and wherein four sub-pixels among the nine sub-pixels arranged in the first direction are opened by the openings, and the other five sub-pixels are covered by the black matrix.

6. The stereopsis display device of claim 1, wherein twenty two sub-pixels are arranged in the first direction and nine sub-pixels are arranged in the second direction to configure the one view matrix, and wherein nine sub-pixels among the twenty two sub-pixels arranged in the first direction are opened by the openings, and the other thirteen sub-pixels are covered by the black matrix.

7. The stereopsis display device of claim 1, wherein sixty two sub-pixels are arranged in the first direction and twenty five sub-pixels are arranged in the second direction to configure the one view matrix, and wherein twenty five sub-pixels among the sixty two sub-pixels arranged in the first direction are opened by the openings, and the other thirty seven sub-pixels are covered by the black matrix.

8. The stereopsis display device of claim 1, wherein the slant angle of each lenticular lens is set by the following Equation 1:

$$SA=\tan-1(N/3M)[N, M: \text{natural number}, N<M], \quad [\text{Equation 1}]$$

wherein 'SA' refers to the slant angle of the lenticular lens.

9. The stereopsis display device of claim 8, wherein a pixel electrode and a common electrode arranged in each of the plurality of sub-pixels opened by the openings have the same layout but their exposed portions are different from one another.

10. The stereopsis display device of claim 8, wherein one pixel group is comprised of the plurality of sub-pixels opened by the openings, a pixel electrode and a common electrode arranged in each of the plurality of sub-pixels included in the one pixel group have the same layout but their exposed portions are different from one another.

11. The stereopsis display device of claim 1, wherein the plurality of lenticular lenses are arranged at a first slant angle, and the openings are arranged at a second slant angle different from the first slant angle.

12. The stereopsis display device of claim 11, wherein the second slant angle is slanted at an angle of maximum ±3.5° with respect to the first slant angle.

13. The stereopsis display device of claim 11, wherein some of the openings arranged to adjoin each other in the first direction are overlapped with each other.

14. A stereopsis display device comprising:
a plurality of sub-pixels including openings;
a black matrix defining the openings; and
a plurality of lenticular lenses slanted at a slant angle,
wherein one view matrix includes a unit of 2M number of sub-pixels arranged in a first direction and N number of sub-pixels arranged in a second direction, wherein M is a positive integer and N is a positive integer, and
wherein a number of pixel groups opened by the openings among the unit of 2M number of sub-pixels arranged in the first direction is N, and each of the N number of pixel groups includes a plurality of sub-pixels adjacent to each other in the first direction.

15. The stereopsis display device of claim 14, wherein the openings exposing the plurality of sub-pixels adjacent to each other up and down have their respective positions different from one another, or the openings exposing the plurality of sub-pixels adjacent to each other up and down have their respective shapes different from one another.

16. The stereopsis display device of claim 14, wherein the 'M' is one of 62, 64 and 70, the 'N' is 25 or 33, 25 or 33 pixel groups are opened by the openings, and each of the 25 or 33 pixel groups includes 2 sub-pixels adjacent to each other up and down.

17. The stereopsis display device of claim 14, wherein the slant angle of each lenticular lens is set by the following Equation 2:

$$SA=\tan-1(N/4M)[N, M: \text{natural number}, N<M], \quad [\text{Equation 2}]$$

where 'SA' refers to the slant angle of the lenticular lens.

18. The stereopsis display device of claim 17, wherein a pixel electrode and a common electrode arranged in each of the plurality of sub-pixels included in the N number of pixel groups have the same layout but their exposed portions by the openings are different from one another.

19. The stereopsis display device of claim 14, wherein the plurality of lenticular lenses are arranged at a first slant angle, and the openings are arranged at a second slant angle different from the first slant angle.

20. The stereopsis display device of claim 19, wherein the second slant angle is slanted at an angle of maximum ±3.5° with respect to the first slant angle.

* * * * *